United States Patent [19]

Kuehl et al.

[11] Patent Number: 5,401,896
[45] Date of Patent: * Mar. 28, 1995

[54] PROCESS FOR PREPARING LONG CHAIN ALKYL AROMATIC COMPOUNDS

[75] Inventors: Guenter H. Kuehl, Cherry Hill, N.J.; Daria N. Lissy, Glen Mills, Pa.; Hye Kyung C. Timken, Woodbury, N.J.

[73] Assignee: Mobil Oil Corp., Fairfax, Va.

[ * ] Notice: The portion of the term of this patent subsequent to Aug. 17, 2010 has been disclaimed.

[21] Appl. No.: 980,935

[22] Filed: Nov. 23, 1992

Related U.S. Application Data

[63] Continuation-in-part of Ser. No. 802,938, Dec. 6, 1991, Pat. No. 5,236,575, which is a continuation-in-part of Ser. No. 717,436, Jun. 19, 1991, abandoned.

[51] Int. Cl.$^6$ .......................... C07C 2/64; C07C 2/68; C07C 15/107
[52] U.S. Cl. ...................... 585/455; 585/467; 568/715; 570/182; 570/183; 570/190; 570/201
[58] Field of Search ................ 585/455, 467; 568/715; 570/182, 183, 190, 201

[56] References Cited

U.S. PATENT DOCUMENTS

| | | | |
|---|---|---|---|
| 4,439,409 | 3/1984 | Puppe et al. | 423/328 |
| 4,826,667 | 5/1989 | Zones et al. | 423/277 |
| 4,954,325 | 9/1990 | Rubin et al. | 423/328 |
| 4,954,663 | 9/1990 | Marler et al. | 568/791 |
| 4,962,256 | 10/1990 | Le et al. | 585/467 |
| 4,981,663 | 1/1991 | Rubin | 423/277 |
| 4,992,606 | 2/1991 | Kushnerick et al. | 585/467 |
| 5,001,295 | 3/1991 | Angevine et al. | 585/467 |
| 5,021,141 | 6/1991 | Rubin | 208/46 |
| 5,043,501 | 8/1991 | Del Rossi et al. | 585/323 |
| 5,236,575 | 8/1993 | Bennett | 502/77 |

FOREIGN PATENT DOCUMENTS 0293032 8/1981 European Pat. Off. .

*Primary Examiner*—Patrick P. Garvin
*Assistant Examiner*—E. D. Irzinski
*Attorney, Agent, or Firm*—Alexander J. McKillop; Malcolm D. Keen; Dennis P. Santini

[57] ABSTRACT

Relatively long chain alkyl aromatic compounds are prepared by alkylating an alkylatable aromatic compound with a relatively long chain alkylating agent under alkylation reaction conditions in the presence of catalyst comprising zeolite MCM-49.

24 Claims, 6 Drawing Sheets

PROCESS FOR PREPARING LONG CHAIN ALKYL AROMATIC COMPOUNDS

CROSS-REFERENCE TO RELATED APPLICATIONS

This application is a continuation-in-part of U.S. patent application Ser. No. 07/802,938, filed Dec. 6, 1991, now U.S. Pat. No. 5,236,575, which is a continuation-in-part of U.S. patent application Ser. No. 07/717,436, filed Jun. 19, 1991, and now abandoned.

BACKGROUND OF THE INVENTION

This invention relates to a process for preparing long chain alkyl aromatic compounds by alkylating an aromatic compound with a relatively long chain alkylating agent employing a particular synthetic porous crystalline material as alkylation catalyst. The present process is highly selective for linear monoalkyl benzenes when the aromatic compound comprises benzene and the alkylating agent comprises a long chain linear olefin.

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties. Such molecular sieves, both natural and synthetic, include a wide variety of positive ion-containing crystalline silicates. These silicates can be described as a rigid three-dimensional framework of $SiO_4$ and Periodic Table Group IIIA element oxide, e.g., $AlO_4$, in which the tetrahedra are cross-linked by the sharing of oxygen atoms whereby the ratio of the total Group IIIA element, e.g., aluminum, and silicon atoms to oxygen atoms is 1:2. The electrovalence of the tetrahedra containing the Group IIIA element, e.g., aluminum, is balanced by the inclusion in the crystal of a cation, e.g., an alkali metal or an alkaline earth metal cation. This can be expressed wherein the ratio of the Group IIA element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite Z (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); zeolite ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolilte X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724, 4,073,865 and 4,104,294 describe crystalline silicates of varying alumina and metal content.

U.S. Pat. No. 4,439,409 refers to a composition of matter named PSH-3 and its synthesis from a reaction mixture containing hexamethyleneimine, an organic compound which acts as directing agent for synthesis of the presently used MCM-49. A composition of matter appearing to be identical to the PSH-3 of U.S. Pat. No. 4,439,409, but witch additional structural components, is taught in European Patent Application 293,032. Hexamethyleneimine is also used for synthesis of MCM-22 in U.S. Pat. No. 4,954,325; MCM-35 in U.S. Pat. No. 4,981,663; and a ZSM-12 material in U.S. Pat. No. 5,021,141. A composition of matter referred to as zeolite SSZ-25 is taught in U.S. Pat. No. 4,826,667 and European Patent Application 231,860, said zeolite being synthesized from a reaction mixture containing an adamantane quaternary ammonium ion.

The alkylation of aromatic hydrocarbons with an olefin in the presence of a zeolite having uniform pore openings of from about 6 to about 15 Angstrom units is described in U.S. Pat. No. 2,904,607. U.S. Pat. No. 3,251,897 describes the alkylation of aromatic hydrocarbons in the presence of X- or Y-type zeolites, specifically such zeolites wherein the cation is a rare earth metal species and/or hydrogen. U.S. Pat. Nos. 3,751,504 and 3,751,506 describe the vapor phase alkylation of aromatic hydrocarbons with olefins, e.g., benzene with ethylene, in the presence of catalyst comprising, for example, ZSM-5.

U.S. Pat. Nos. 3,631,120 and 3,641,177, describe a liquid phase process for the alkylation of aromatic hydrocarbons with olefins in the presence of certain zeolites.

U.S. Pat. Nos. 4,301,316 and 4,301,317 disclose the use of such zeolites as ZSM-4, ZSM-20, ZSM-38, mazzite, Linde Type L and zeolite Beta to catalyze the alkylation of benzene with relatively long chain olefins to produce long chain alkylbenzenes.

U.S. Pat. Nos. 4,962,256; 4,992,606; 4,954,663; 5,001,295; and 5,043,501, each incorporated herein by reference in its entirety, teach alkylation of aromatic compounds with various alkylating agents over catalyst comprising a particular crystalline material, such as PSH-3 or MCM-22. U.S. Pat. No. 4,962,256 describes preparing long chain alkylaromatic compounds by alkylating an aromatic compound with a long chain alkylating agent. U.S. Pat. No. 4,992,606 describes preparing short chain alkylaromatics by alkylating an aromatic compound with a short chain alkylating agent. U.S. Pat. No. 4,954,663 teaches alkylation of phenols, and U.S. Pat. No. 5,001,295 teaches alkylation of naphthalene.

U.S. Pat. No. 5,043,501 describes preparation of 2,6-dimethylnaphthalene.

SUMMARY OF THE INVENTION

It is an object of this invention to provide a process for the alkylation of an aromatic compound with a relatively long chain alkylating agent to produce a long chain alkyl aromatic product employing an alkylation catalyst comprising a particular, porous crystalline material designated MCM-49, characterized as-synthesized by an X-ray diffraction pattern including interplanar d-spacings at 13.15±0.26, 12.49±0.24, 11.19±0.22, 6.43±0.12, 4.98±0.10, 4.69±0.09, 3.44±0.07, and 3.24±0.06 Angstroms. The d-spacing maximum at 13.15±0.26 Angstroms is observed as a shoulder of the intense peak at 12.49±0.24 Angstroms.

It is a particular object of the present invention to provide a process for selectively producing long chain linear monoalkylaromatic compounds when benzene or the like is alkylated with an alkylating agent comprising a long chain linear olefin or the like.

It is another particular object of the invention to provide long chain alkylbenzenes which are useful, inter alia, as intermediates in the manufacture of synthetic detergents.

It is still another particular object of the present invention to provide a process for the alkylation of an aromatic hydrocarbon stream, e.g., one containing one or more of benzene, toluene, xylene, naphthalene, and the like, with a relatively long chain alkylating agent to produce an aromatic lube base stock of low pour and cloud point, high viscosity and improved thermal and oxidative stability properties.

By way of realizing the foregoing and other objects of the invention, a process for preparing long chain alkyl aromatic compounds is provided which comprises contacting at least one alkylatable aromatic compound with at least one alkylating agent possessing an alkylating aliphatic group having at least six carbon atoms under alkylation reaction conditions and in the presence of an alkylation catalyst to provide an alkylated aromatic product possessing at least one alkyl group derived from said alkylating agent, said catalyst comprising MCM-49, a synthetic porous crystalline material characterized as-synthesized by an X-ray diffraction pattern substantially as set forth in Table I, infra.

DESCRIPTION OF SPECIFIC EMBODIMENTS

Figure 1A:
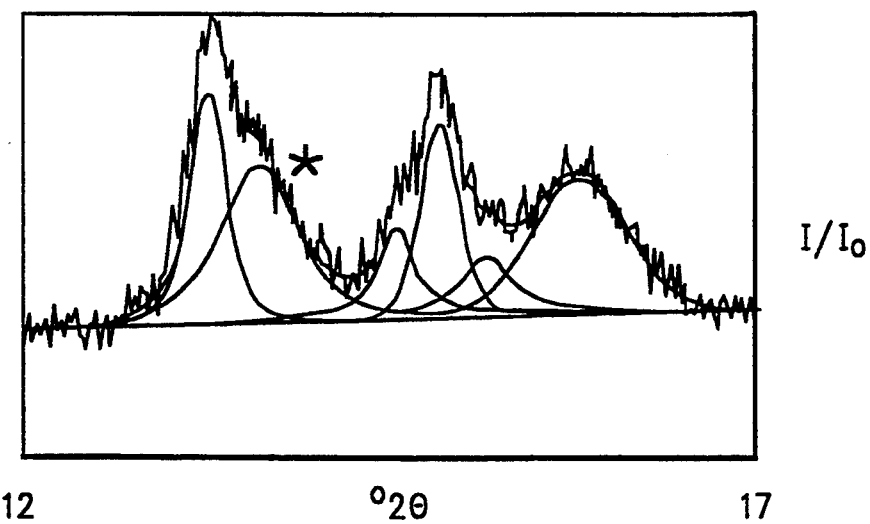
FIG. 1a shows a segment of the X-ray diffraction pattern of the as-synthesized precursor of MCM-22 from a repeat of Example 1 of U.S. Pat. No. 4,954,325.

The entire contents of application Ser. No. 07/802,938, now U.S. Pat. No. 5,236,575, teaching MCM-49, are incorporated herein by reference.

The term "aromatic" in reference to the alkylatable compounds which are useful herein is to be understood in accordance with its art-recognized scope which includes alkyl substituted and unsubstituted mono- and polynuclear compounds. Compounds of an aromatic character which possess a hetero atom are also useful provided they do not act as catalyst poisons under the reaction conditions selected.

Substituted aromatic compounds which can be alkylated herein must possess at least one hydrogen atom directly bonded to the aromatic nucleus. The aromatic rings can be substituted with one or more alkyl, aryl, alkaryl, alkoxy, aryloxy, cycloalkyl, halide, and/or other groups which do not interfere with the alkylation reaction.

Suitable aromatic hydrocarbons include benzene, naphthalene, anthracene, naphthacene, perylene, coronene and phenanthrene.

Generally the alkyl groups which can be present as substituents on the aromatic compound contain from one to about 22 carbon atoms and usually from about one to eight carbon atoms, and most usually from about one to four carbon atoms.

Suitable alkyl substituted aromatic compounds include toluene, xylene, isopropylbenzene, normal propylbenzene, alpha-methylnaphthalene, ethylbenzene, cumene, mesitylene, durene, p-cymene, butylbenzene, pseudocumene, o-diethylbenzene, m-diethylbenzene, p-diethylbenzene, isoamylbenzene, isohexylbenzene, pentaethylbenzene, pentamethylbenzene; 1,2,3,4-tetraethylbenzene; 1,2,3,5-tetramethylbenzene; 1,2,4-triethylbenzene; 1,2,3-trimethylbenzene, m-butyltoluene; p-butyltoluene; 3,5-diethyltoluene; o-ethyltoluene; p-ethyltoluene; m-propyltoluene; 4-ethyl-m-xylene; dimethylnaphthalenes; ethylnaphthalene; 2,3-dimethylanthracene; 9-ethylanthracene; 2-methylanthracene; o-methylanthracene; 9,10-dimethylphenanthrene; and 3-methyl-phenanthrene. Higher molecular weight alkylaromatic hydrocarbons can also be used as starting materials and include aromatic hydrocarbons such as are produced by the alkylation of aromatic hydrocarbons with olefin oligomers. Such product are frequently referred to in the art as alkylate and include hexylbenzene, nonylbenzene, dodecylbenzene, pentadecylbenzene, hexyltoluene, nonyltoluene, dodecyltoluene, pentadecytoluene, etc. Very often alkylate is obtained as a high boiling fraction in which the alkyl group attached to the aromatic nucleus varies in size from about $C_6$ to about $C_{12}$.

Reformate containing substantial quantities of benzene, toluene and/or xylene constitutes a particularly useful feed for the alkylation process of this invention.

The alkylating agents which are useful in the process of this invention generally include any aliphatic or aromatic organic compound having one or more available alkylating aliphatic groups capable of reaction with the alkylatable aromatic compound. The alkylating group itself should have at least about 6 carbon atoms, preferably at least about 8, and still more preferably at least about 12 carbon atoms. Examples of suitable alkylating agents are olefins such as hexenes, heptenes, octenes, nonenes, decenes, undecenes, dodecenes, and the like; alcohols (inclusive of monoalcohols, dialcohols, trialcohols, etc.) such as hexanols, heptanols, octanols, nonanols, decanols, undecanols and dodecanols; and alkyl halides such as hexyl chlorides, octyl chlorides, dodecyl chlorides; and, higher homologs of the foregoing. Branched alkylating agents, especially oligomerized olefins such as the trimers, tetramers, pentamers, etc., of light olefins such as ethylene, propylene, the butylenes, etc., are also useful herein.

The crystalline material MCM-49 for use as catalyst component in this invention has a composition involving the molar relationship:

$$X_2O_3:(n)YO_2,$$

wherein X is a trivalent element, such as aluminum, boron, iron and/or gallium, preferably aluminum; Y is a tetravalent element such as silicon, titanium, and/or germanium, preferably silicon; and n is less than about 35, e.g., from 2 to less than about 35, usually from about 10 to less than about 35, more usually from about 15 to about 31. In the as-synthesized form, the material has a formula, on an anhydrous basis and in terms of moles of oxides per n moles of $YO_2$, as follows:

$$(0.1-0.6)M_2O:(1-4)R:X_2O_3:nYO_2$$

wherein M is an alkali or alkaline earth metal, and R is an organic moiety. The M and R components are associated with the material as a result of their presence during crystallization, and are easily removed by post-crystallization methods hereinafter more particularly described.

The crystalline material of the invention is thermally stable and in the calcined form exhibits high surface area (greater than 400 $m^2/gm$) and unusually large sorption capacity when compared to previously described materials such as calcined PSH-3 and SSZ-25 having similar X-ray diffraction patterns. To the extent desired, the original sodium cations of the as-synthesized material can be replaced in accordance with techniques well known in the art, at least in part, by ion exchange with other cations. Preferred replacing cations include metal ions, hydrogen ions, hydrogen precursor, e.g., ammonium, ions and mixtures thereof. Particularly preferred cations are those which tailor the catalytic activity for certain hydrocarbon conversion reactions. These include hydrogen, rare earth metals and metals of Groups IIA, IIIA, IVA, IB, IIB, IIIB, IVB and VIII of the Periodic Table of the Elements.

In the as-synthesized form, the crystalline MCM-49 material for use in the invention appears to be a single crystalline phase. It can be prepared in essentially pure form with little or no detectable impurity crystal phases and has an X-ray diffraction pattern which is distinguished from the patterns of other known as-synthesized or thermally treated crystalline materials by the lines listed in Table I below:

TABLE I

| Interplanar d-Spacing (A) | Relative Intensity, I/Io × 100 |
|---|---|
| 13.15 ± 0.26 | w-s* |
| 12.49 ± 0.24 | vs |
| 11.19 ± 0.22 | m-s |
| 6.43 ± 0.12 | w |
| 4.98 ± 0.10 | w |
| 4.69 ± 0.09 | w |
| 3.44 ± 0.07 | vs |

TABLE I-continued

| Interplanar d-Spacing (A) | Relative Intensity, I/Io × 100 |
|---|---|
| 3.24 ± 0.06 | w |

*shoulder

The X-ray diffraction peak at 13.15±0.26 Angstrom Units (A) is usually not fully resolved for MCM-49 from the intense peak at 12.49±0.24, and is observed as a shoulder of this intense peak. For this reason, the precise intensity and position of the 13.15±0.26 Angstroms peak are difficult to determine within the stated range.

In its calcined form, the crystalline MCM-49 material for use in the invention is a single crystal phase with little or no detectable impurity crystal phases having an X-ray diffraction pattern which is not easily distinguished from that of MCM-22, but is readily distinguishable from the patterns of other known crystalline materials. The X-ray diffraction pattern of the calcined form of MCM-49 includes the lines listed in Table II below:

TABLE II

| Interplanar d-Spacing (A) | Relative Intensity, I/Io × 100 |
|---|---|
| 12.41 ± 0.24 | vs |
| 11.10 ± 0.22 | s |
| 8.89 ± 0.17 | m-s |
| 6.89 ± 0.13 | w |
| 6.19 ± 0.12 | m |
| 6.01 ± 0.12 | w |
| 5.56 ± 0.11 | w |
| 4.96 ± 0.10 | w |
| 4.67 ± 0.09 | w |
| 4.59 ± 0.09 | w |
| 4.39 ± 0.09 | w |
| 4.12 ± 0.08 | w |
| 4.07 ± 0.08 | w-m |
| 3.92 ± 0.08 | w-m |
| 3.75 ± 0.07 | w-m |
| 3.57 ± 0.07 | w |
| 3.43 ± 0.07 | s-vs |
| 3.31 ± 0.06 | w |
| 3.21 ± 0.06 | w |
| 3.12 ± 0.06 | w |
| 3.07 ± 0.06 | w |
| 2.83 ± 0.05 | w |
| 2.78 ± 0.05 | w |
| 2.69 ± 0.05 | w |
| 2.47 ± 0.05 | w |
| 2.42 ± 0.05 | w |
| 2.38 ± 0.05 | w |

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units (A), and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60–100), s=strong (40–60), m=medium (20–40) and w=weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, and thermal and/or hydrothermal history. Other changes in diffraction patterns can be indicative of important differences between materials, which is the case for comparing MCM-49 with similar materials, e.g., MCM-22 and PSH-3.

The significance of differences in the X-ray diffraction patterns of these materials can be explained from a knowledge of the structures of the materials. MCM-22 and PSH-3 are members of an unusual family of materials because, upon calcination, there are changes in the X-ray diffraction pattern that can be explained by a significant change in one axial dimension. This is indicative of a profound change in the bonding within the materials and not a simple loss of the organic material. The precursor members of this family can be clearly distinguished by X-ray diffraction from the calcined members. An examination of the X-ray diffraction patterns of both precursor and calcined forms shows a number of reflections with very similar position and intensity, while other peaks are different. Some of these differences are directly related to the changes in the axial dimension and bonding.

Figure 1B:
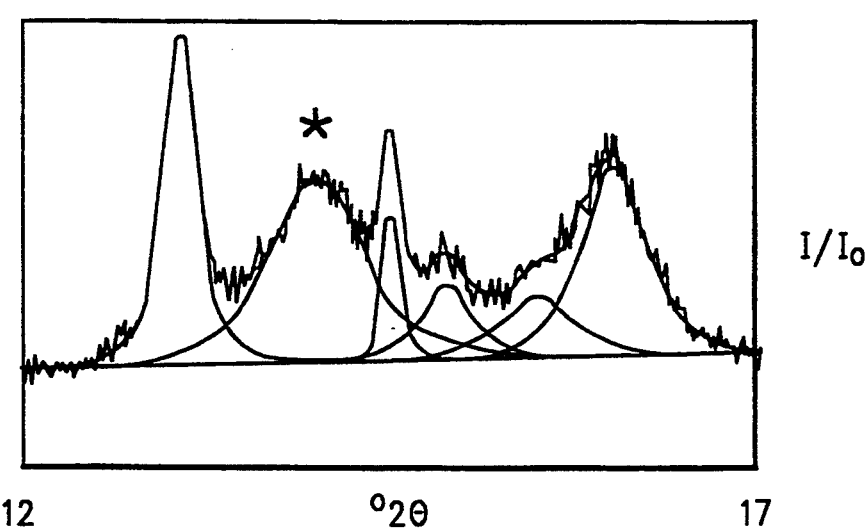
FIG. 1b shows a segment of the X-ray diffraction pattern of the as-synthesized crystalline material product of Example 7, hereinafter presented.
Figure 1C:
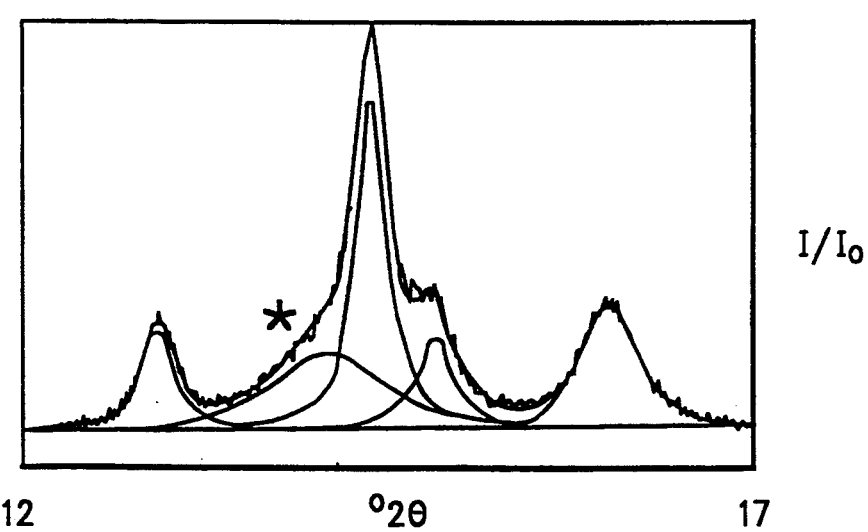
FIG. 1c shows a segment of the X-ray diffraction pattern of the calcined MCM-22 from a repeat of Example 1 of U.S. Pat. No. 4,954,325.

The present as-synthesized MCM-49 has an axial dimension similar to those of the calcined members of the family and, hence, there are similarities in their X-ray diffraction patterns. Nevertheless, the MCM-49 axial dimension is different from that observed in the calcined materials. For example, the changes in axial dimensions in MCM-22 can be determined from the positions of peaks particularly sensitive to these changes. Two such peaks occur at ~13.5 Angstroms and ~6.75 Angstroms in precursor MCM-22, at ~12.8 Angstroms and ~6.4 Angstroms in as-synthesized MCM-49, and at ~12.6 Angstroms and ~6.30 Angstroms in the calcined MCM-22. Unfortunately, the ~12.8 Angstroms peak in MCM-49 is very close to the intense ~12.4 Angstroms peak observed for all three materials, and is frequently not fully separated from it. Likewise, the ~12.6 Angstroms peak of the calcined MCM-22 material is usually only visible as a shoulder on the intense ~12.4 Angstroms peak. FIG. 1 shows the same segment of the diffraction patterns of precursor MCM-22, calcined MCM-22, and MCM-49; the position of the ~6.6–6.3 Angstroms peak is indicated in each segment by an asterisk. Because the ~6.4 Angstroms peak is unobscured in MCM-49, it was chosen as a better means of distinguishing MCM-49 from the calcined forms of MCM-22 and PSH-3 rather than the much stronger ~12.8 Angstroms peak. Table I lists all diffraction peaks characteristic of MCM-49.

Figure 8:
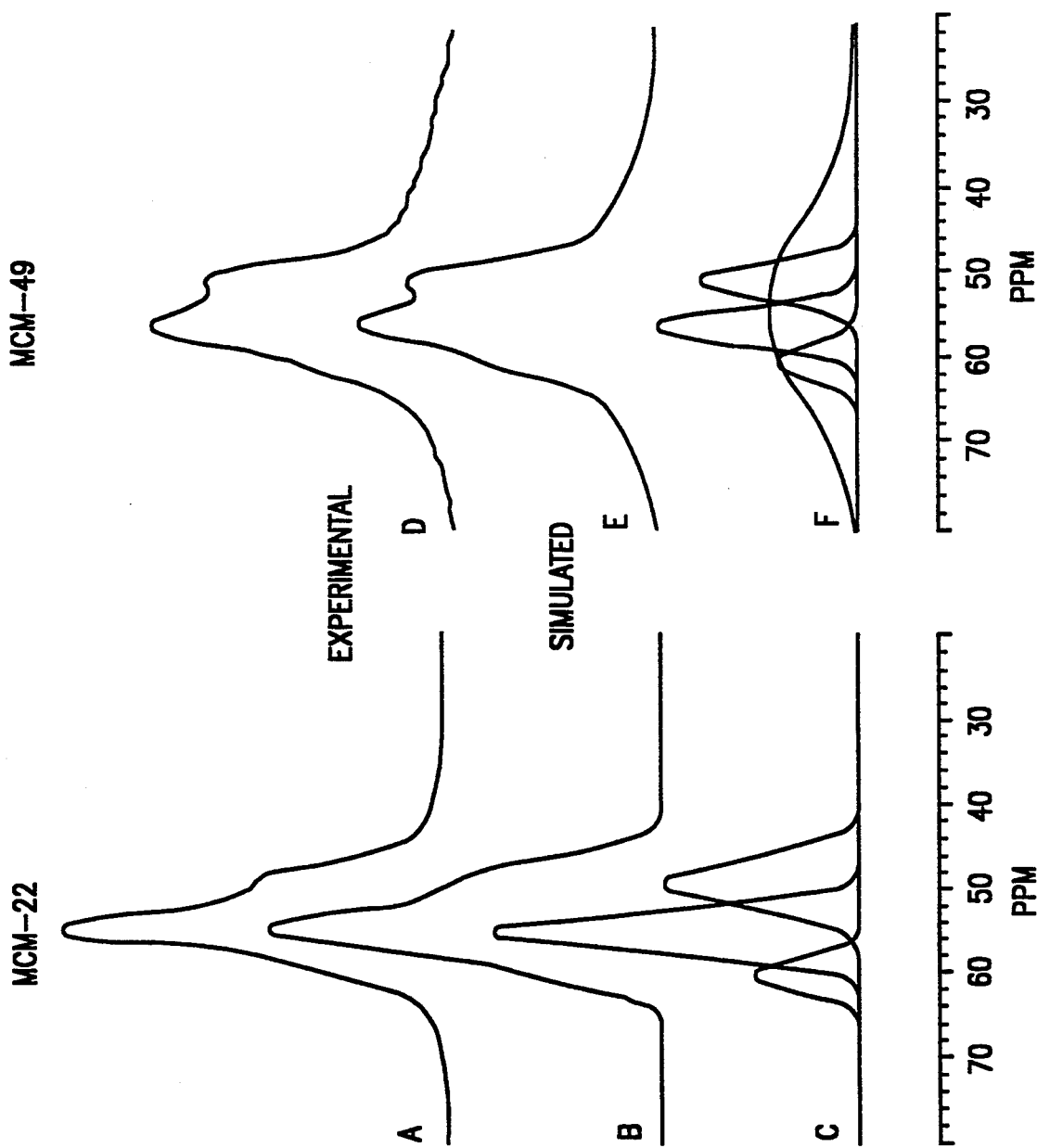
FIG. 8 compares the $^{27}Al$ MAS NMR spectra of calcined MCM-49 and calcined/MCM-22.

As shown in FIG. 8, a difference between calcined MCM-49 and calcined MCM-22 can be demonstrated by $^{27}$Al MAS NMR. When calcined completely to remove the organic material used to direct its synthesis (FIG. 8D), MCM-49 exhibits a $^{27}$Al MAS NMR spectrum different from that of fully calcined MCM-22 (FIG. 8A). In each case, calcination is effected at 538° C. for 16 hours. The NMR spectra are obtained using a Bruker MSL-400 spectrometer at 104.25 MHz with 5.00 KHz spinning speed, 1.0 μs excitation pulses (solution $\pi/2=6$ μs), and 0.1 S recycle times. The number of transients obtained for each sample is 2000, and the $^{27}$Al chemical shifts are referenced to a 1M aqueous solution of Al(NO$_3$)$_2$ at 0.0 ppm. As shown in FIGS. 8B and 8C, fully calcined MCM-22 exhibits a $^{27}$Al MAS NMR spectrum in which the $T_d$ Al region can be simulated as comprising 3 peaks centered at 61, 55, and 50 ppm having approximate relative areas of 10:50:40. In contrast, fully calcined MCM-49 exhibits a $^{27}$Al MAS NMR spectrum in which the $T_d$ Al region can be simulated as comprising the 3 peaks center at 61, 55, and 50 ppm but having approximate relative areas of 20:45:35, together with a fourth broad peak centered at 54 ppm (FIGS. 8E and 8F). Formation of the broad $T_d$ component does not appear to be dependent on the calcination environment (air or nitrogen). Calcined MCM-49 also exhibits distinctly different catalytic properties than calcined MCM-22.

MCM-49 can be prepared from a reaction mixture containing sources of alkali or alkaline earth metal (M), e.g. sodium or potassium, cation, an oxide of trivalent element X, e.g. aluminum, an oxide: of tetravalent element Y, e.g. silicon, directing agent (R), and water, said reaction mixture having a composition, in terms of mole ratios of oxides, within the following ranges:

| Reactants | Useful | Preferred |
|---|---|---|
| YO$_2$/X$_2$O$_3$ | 12 to <35 | 18 to 31 |
| H$_2$O/YO$_2$ | 10 to 70 | 15 to 40 |
| OH$^-$/YO$_2$ | 0.05 to 0.50 | 0.05 to 0.30 |
| M/YO$_2$ | 0.05 to 3.0 | 0.05 to 1.0 |
| R/YO$_2$ | 0.2 to 1.0 | 0.3 to 0.5 |

In this synthesis method, if more than one X component is present, at least one must be present such that the YO$_2$/X$_2$O$_3$ molar ratio thereof is less than about 35. For example, if aluminum oxide and gallium oxide components are used in the reaction mixture, at least one of the YO$_2$/Al$_2$O$_3$ and YO$_2$/Ga$_2$O$_3$ molar ratios must be less than about 35. If only aluminum oxide has been added to the reaction mixture as a source of X, the YO$_2$/Al$_2$O$_3$ ratio must be less than about 35.

In the above synthesis method, the source of YO$_2$ must be comprised predominately of solid YO$_2$, for example at least about 30 wt. % solid YO$_2$ in order to obtain the crystal product of the invention. Where YO$_2$ is silica, the use of a silica source containing at least about 30 wt. % solid silica, e.g. Ultrasil (a precipitated, spray dried silica containing about 90 wt. % silica) or HiSil (a precipitated hydrated SiO$_2$ containing about 87 wt. % silica, about 6 wt. % free H$_2$O and about 4.5 wt. % bound H$_2$O of hydration and having a particle size of about 0.02 micron) favors crystalline MCM-49 formation from the above mixture. Preferably, therefore, the YO$_2$, e.g. silica, source contains at least about 30 wt. % solid YO$_2$, e.g. silica, and more preferably at least about 40 wt. % solid YO$_2$, e.g. silica.

Directing agent R is selected from the group consisting of cycloalkylamine, azacycloalkane, diazacycloalkane, and mixtures thereof, alkyl comprising from 5 to 8 carbon atoms. Non-limiting examples of R include cyclopentylamine, cyclohexylamine, cycloheptylamine, hexamethyleneimine, heptamethyleneimine, homopiperazine, and combinations thereof.

Crystallization of MCM-49 crystalline material can be carried out at either static or stirred conditions in a suitable reactor vessel, such as for example, polypropylene jars or teflon lined or stainless steel autoclaves. The total useful range of temperatures for crystallization is from about 80° C. to about 225° C. for a time sufficient for crystallization to occur at the temperature used, e.g. from about 24 hours to about 60 days. Thereafter, the crystals are separated from the liquid and recovered.

It should be realized that the reaction mixture components can be supplied by more than one source. The reaction mixture can be prepared either batchwise or continuously. Crystal size and crystallization time of MCM-49 crystalline material will vary with the nature of the reaction mixture employed and the crystallization conditions.

Synthesis of MCM-49 may be facilitated by the presence of at least 0.01 percent, preferably 0.10 percent and still more preferably 1 percent, seed crystals (based on total weight) of crystalline product. Useful seed crystals include MCM-22 and/or MCM-49.

The crystals prepared as above for use herein can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The alkylation catalyst herein can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be introduced in the catalyst composition by way of co-crystallization, exchanged into the composition to the extent a Group IIIA element, e.g., aluminum, is in the structure, impregnated therein or intimately physically admixed therewith. Such component can be impregnated in, or on, the zeolite such as, for example, by, in the case of platinum, treating the zeolite with a solution containing a platinum metal-containing ion. Thus, suitable platinum compounds for this purpose include chloroplatinic acid, platinum halides and various compounds containing the platinum ammine complex.

Zeolite MCM-49, especially in its metal, hydrogen and ammonium forms, can be beneficially converted to another form by thermal treatment. This thermal treatment is generally performed by heating one of these forms at a temperature of at least about 370° C. for at least 1 minute and generally not longer than 20 hours. While subatmospheric pressure can be employed for the thermal treatment, atmospheric pressure is preferred simply for reasons of convenience. The thermal treatment can be performed at a temperature of up to about 925° C.

Prior to its use in the alkylation process of this invention, the zeolite MCM-49 crystals should be dehydrated, at least partially. This can be done by heating the crystals to a temperature in the range of from about 200° C. to about 595° C. in an atmosphere such as air, nitrogen, etc., and at atmospheric, subatmospheric or superatmospheric pressures for between about 30 minutes to about 48 hours. Dehydration can also be performed at room temperature merely by placing the crystalline material in a vacuum, but a longer time is required to obtain a sufficient amount of dehydration.

It may be desired to incorporate the MCM-49 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

The stability of zeolite MCM-49 may be increased by combining the as-synthesized MCM-49 with an alumina binder, converting the alumina-bound MCM-49 to the hydrogen form, (i.e., HMCM-49) and steaming the alumina-bound HMCM-49 composition under conditions sufficient to increase the stability of the catalyst. U.S. Pat. Nos. 4,663,492; 4,594,146; 4,522,929; and, 4,429,176, the entire disclosures of which are incorporated herein by reference, describe conditions for the steam stabilization of zeolite catalysts which can be utilized to steam-stabilize alumina-bound HMCM-49. The steam stabilization conditions include contacting the alumina bound HMCM-49 with, e.g., 5–100% steam at a temperature of at least about 300° C. (e.g., 300°–650° C.) for at least one hour (e.g., 1–200 hours) at a pressure of 101–2,500 kPa. In a more particular embodiment, the catalyst can be made to undergo steaming with 75–100% steam at 315°–500° C. and atmospheric pressure for 2-25 hours. In accordance with the steam stabilization treatment described in the above-mentioned patents, the steaming of the catalyst can take place under conditions sufficient to initially increase the Alpha Value of the catalyst, the significance of which is discussed infra, and produce a steamed catalyst having a peak Alpha Value. If desired, steaming can be continued to subsequently reduce the Alpha Value from the peak Alpha Value to an Alpha Value which is substantially the same as the Alpha Value of the unsteamed catalyst.

The alkylation process of this invention is conducted such that the organic reactants, i.e., the alkylatable aromatic compound and the alkylating agent, are brought into contact with the zeolite MCM-49 catalyst composition in a suitable reaction zone such as, for example, in a flow reactor containing a fixed bed of the catalyst composition, under effective alkylation conditions. Such conditions include a temperature of from about 0° C. to about 500° C., a pressure of from about 0.2 to about 250 atmospheres, a feed weight hourly space velocity (WHSV) of from about 0.1 hr$^{-1}$ to about 500 hr$^{-1}$ and an alkylatable aromatic compound to alkylating agent mole ratio of from about 0.1:1 to about 50:1. The WHSV is based upon the weight of the catalyst composition employed, i.e., the total weight of active catalyst (and binder if present). Preferred reaction conditions include a temperature within the approximate range of from about 100° C. to about 350° C., a pressure of from about 1 to about 25 atmospheres, a WHSV of from about 0.5 to about 100 hr$^{-1}$ and an alkylatable aromatic compound to alkylating agent mole ratio of from about 0.5:1 to about 5:1. The reactants can be in either the vapor phase or the liquid phase and can be neat, i.e., free from intentional admixture or dilution with other material, or they can be brought into contact with the zeolite catalyst composition with the aid of carrier gases or diluents such as, for example, hydrogen or nitrogen.

The alkylation process described herein can be carried out as a batch-type, semi-continuous or continuous operation utilizing a fixed or moving bed catalyst system. A preferred embodiment entails use of a catalyst zone wherein the hydrocarbon charge is passed concurrently or countercurrently through a moving bed of particle-form catalyst. The latter, after use, is conducted to a regeneration zone where coke is burned from the catalyst in an oxygen-containing atmosphere (such as air) at elevated temperature, after which the regenerated catalyst is recycled to the conversion zone for further contact with the organic reactants.

In order to more fully illustrate the nature of the invention and the manner of practicing same, the following examples are presented. In the examples, whenever sorption data are set forth for comparison of sorptive capacities for water, cyclohexane and/or n-hexane, they were Equilibrium Adsorption values determined as follows:

A weighed sample of the calcined adsorbant was contacted with the desired pure adsorbate vapor in an adsorption chamber, evacuated to less than 1 mm and contacted with 12 Torr of water vapor and 40 Torr of n-hexane or cyclohexane vapor, pressures less than the vapor-liquid equilibrium pressure of the respective adsorbate at 90° C. The pressure was kept constant (within about ±0.5 mm) by addition of adsorbate vapor controlled by a manostat during the adsorption period, which did not exceed about 8 hours. As adsorbate was adsorbed by the crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant. The MCM-49 for use herein always exhibits Equilibrium Adsorption values of greater than about 10 wt. % for water vapor, greater than about 4.3 wt. %, usually greater than about 7 wt. % for cyclohexane vapor and greater than about 10 wt. % for n-hexane vapor. These vapor sorption capacities are a notable distinguishing feature of the present crystalline material.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis*, 61, 395.

EXAMPLE 1

A 1 part quantity of Al$_2$(SO$_4$)$_3$.xH$_2$O was dissolved in a solution containing 1.83 parts of 50% NaOH solution and 13 parts of H$_2$O. To this were added 1.78 parts of hexamethyleneimine (HMI) followed by 6.6 parts of amorphous silica precursor (46% solids). The mixture was thoroughly mixed until uniform.

The reaction mixture had the following composition in mole ratios:

SiO$_2$/Al$_2$O$_3$=30
OH/SiO$_2$=0.25
Na/SiO$_2$=0.43
HMI/SiO$_2$=0.35
H$_2$O/SiO$_2$=19.4

Figure 2:
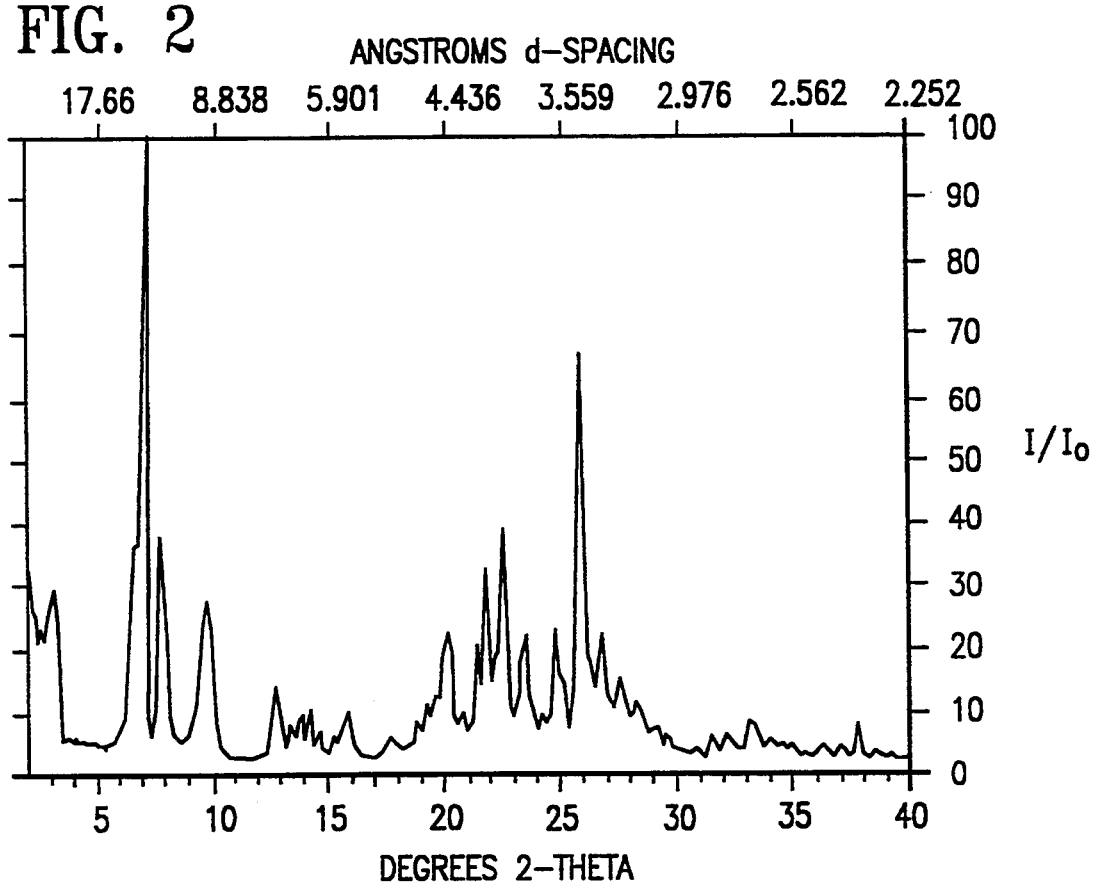
FIGS. 2–7 are X-ray diffraction patterns of the as-synthesized crystalline material products of Examples 1, 3, 5, 7, 8, and 10, respectively, hereinafter presented.

The mixture was crystallized in a stirred reactor at 150° C. for 4 days. The crystals were filtered, washed with water and dried at 120° C. A portion of the product was submitted for X-ray analysis and identified as the new crystalline material MCM-49. The material exhibited the X-ray powder diffraction pattern as shown in Table III and FIG. 2.

The chemical composition of the product was, in wt. %:

| | |
|---|---|
| N | 1.81 |
| Na | 0.38 |
| Al$_2$O$_3$ | 7.1 |
| SiO$_2$ | 72.8 |
| Ash | 79.2 |

The SiO$_2$/Al$_2$O$_3$ molar ratio of this product was 17.4.

The sorption capacities, after calcining for 6 hours at 538° C. were, in wt. %:

| | |
|---|---|
| Cyclohexane, 40 Torr | 4.4 |
| n-Hexane, 40 Torr | 12.8 |
| H$_2$O, 12 Torr | 11.1 |

A portion of the sample was calcined in air for 16 hours at 538° C. This material exhibited the X-ray diffraction pattern shown in Table IV.

TABLE III

| Degrees 2-Theta | Interplanar d-spacing (A) | I/I$_o$ |
|---|---|---|
| 3.2 | 27.5 | 11 |
| 6.75 | 13.09 | 36 sh |
| 7.08 | 12.49 | 100 |
| 7.88 | 11.23 | 40 |
| 9.81 | 9.02 | 24 |
| 12.79 | 6.92 | 13 |
| 13.42 | 6.60 | 5* |
| 13.87 | 6.38 | 6 |
| 14.24 | 6.22 | 7 |
| 14.64 | 6.05 | 4 |
| 15.24 | 5.81 | 2 |
| 15.81 | 5.61 | 8 |
| 17.72 | 5.01 | 2 |
| 18.91 | 4.69 | 4 |
| 19.27 | 4.61 | 5 |
| 20.09 | 4.42 | 19 |
| 20.83 | 4.26 | 6 |
| 21.48 | 4.14 | 15 |
| 21.78 | 4.08 | 29 |
| 22.22 | 4.00 | 12 |
| 22.59 | 3.94 | 36 |
| 23.56 | 3.78 | 19 |
| 24.87 | 3.58 | 21 |
| 25.10 | 3.55 | 6 |
| 25.89 | 3.44 | 80 |
| 26.32 | 3.39 | 7 |
| 26.81 | 3.33 | 17 |
| 27.57 | 3.24 | 11 |
| 28.36 | 3.15 | 7 |
| 29.03 | 3.08 | 3 |
| 29.50 | 3.03 | 2 |
| 31.47 | 2.842 | 3 |
| 32.16 | 2.784 | 3 |
| 33.26 | 2.694 | 6 |
| 34.08 | 2.631 | 2 |
| 34.83 | 2.576 | 1 |
| 36.25 | 2.478 | 2 |
| 36.96 | 2.432 | 2 |
| 37.72 | 2.385 | 7 | sh = Shoulder
\* = Impurity peak

TABLE IV

| Degrees 2-Theta | Interplanar d-spacing (A) | I/I$_o$ |
|---|---|---|
| 3.4 | 26.0 | 6 |
| 6.96 | 12.69 | 45 sh |
| 7.15 | 12.37 | 100 |
| 7.97 | 11.09 | 58 |
| 9.97 | 8.87 | 49 |
| 12.88 | 6.88 | 10 |
| 13.50 | 6.56 | 3* |
| 14.34 | 6.18 | 26 |
| 14.76 | 6.00 | 8 |
| 15.30 | 5.79 | 1 |
| 15.96 | 5.55 | 13 |
| 17.84 | 4.97 | 1 |
| 19.03 | 4.66 | 3 |
| 19.34 | 4.59 | 2 |
| 19.67 | 4.51 | 2* |
| 20.26 | 4.38 | 10 |
| 21.18 | 4.20 | 3 |
| 21.59 | 4.12 | 10 |
| 21.88 | 4.06 | 17 |
| 22.40 | 3.97 | 8 |
| 22.72 | 3.91 | 28 |
| 23.74 | 3.75 | 16 |
| 24.73 | 3.60 | 3 |
| 24.98 | 3.57 | 10 |
| 25.23 | 3.53 | 5 |
| 26.00 | 3.43 | 57 |
| 26.98 | 3.30 | 12 |
| 27.81 | 3.21 | 12 |
| 28.64 | 3.12 | 7 |
| 29.14 | 3.06 | 2 |
| 29.69 | 3.01 | 2 |
| 31.62 | 2.830 | 3 |
| 32.28 | 2.773 | 3 |
| 33.38 | 2.685 | 6 |
| 34.43 | 2.605 | 2 |
| 34.98 | 2.565 | 2 |
| 36.39 | 2.469 | 1 |
| 37.09 | 2.424 | 2 |
| 37.86 | 2.377 | 4 | sh = Shoulder
\* = Impurity peak

EXAMPLE 2

The calcined portion of the product of Example 1 was ammonium exchanged and calcined at 538° C. in air for 16 hours to provide the hydrogen form transformation product of the crystalline MCM-49. The Alpha Test proved this material to have an Alpha Value of 291.

EXAMPLE 3

A 1.45 part quantity of sodium aluminate was added to a solution containing 1 part of 50% NaOH solution and 53.1 parts H$_2$O. A 5.4 part quantity of HMI was added, followed by 10.3 parts of Ultrasil, a precipitated spray-dried silica (about 90% SiO$_2$). The reaction mixture was thoroughly mixed and transferred to a stainless steel autoclave equipped with a stirrer.

The reaction mixture had the following composition in mole ratios:

$SiO_2/Al_2O_3 = 25$
$OH/SiO_2 = 0.19$
$Na/SiO_2 = 0.19$
$HMI/SiO_2 = 0.35$
$H_2O/SiO_2 = 19.3$

Figure 3:
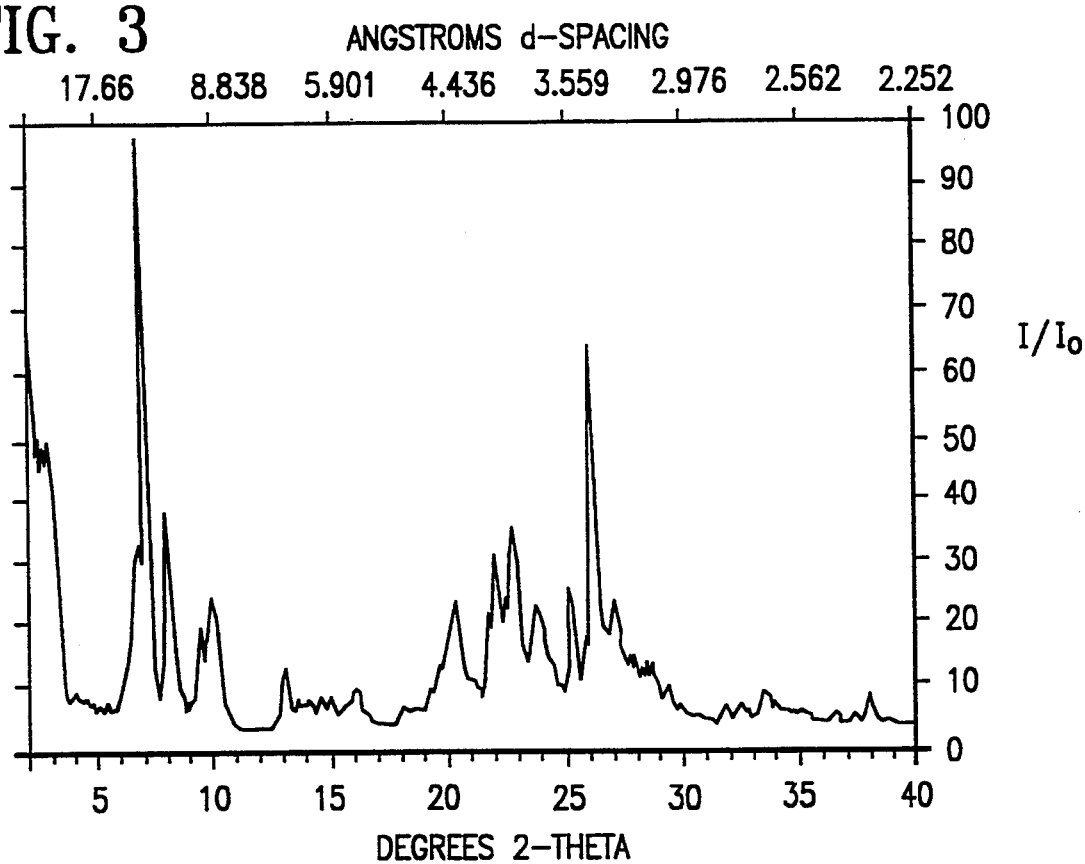

The mixture was crystallized with stirring at 150° C. for 8 days. The product was identified as poorly crystalline MCM-49 and had the X-ray pattern which appears in Table V and FIG. 3.

The chemical composition of the product was, in wt. %:

| N | 2.29 |
|---|---|
| Na | 0.19 |
| Al$_2$O$_3$ | 6.3 |
| SiO$_2$ | 71.0 |
| Ash | 77.9 |

The silica/alumina mole ratio of the product was 19.2.

The sorption capacities, after calcining for 16 hours at 538° C. were, in wt. %:

| Cyclohexane, 40 Torr | 9.9 |
|---|---|
| n-Hexane, 40 Torr | 14.6 |
| H$_2$O, 12 Torr | 15.1 |

A portion of the sample was calcined in air for 16 hours at 538° C. This material exhibited the X-ray diffraction pattern shown in Table VI.

TABLE V

| Degrees 2-Theta | Interplanar d-spacing (A) | I/I$_o$ |
| --- | --- | --- |
| 3.0 | 29.3 | 8 |
| 3.9 | 22.8 | 2+ |
| 6.66 | 13.27 | 34 |
| 7.10 | 12.45 | 100 |
| 7.91 | 11.18 | 39 |
| 9.24 | 9.57 | 16* |
| 9.79 | 9.04 | 23 |
| 12.79 | 6.92 | 11 |
| 13.60 | 6.51 | 5 |
| 14.28 | 6.20 | 5 |
| 14.68 | 6.03 | 5 |
| 15.33 | 5.78 | 2 |
| 15.83 | 5.60 | 7 |
| 17.80 | 4.98 | 2 |
| 18.94 | 4.68 | 3 |
| 19.32 | 4.59 | 8 |
| 20.09 | 4.42 | 21 |
| 21.51 | 4.13 | 17 |
| 21.82 | 4.07 | 27 |
| 22.17 | 4.01 | 13 |
| 22.58 | 3.94 | 33 |
| 23.50 | 3.79 | 19 |
| 24.09 | 3.69 | 8* |
| 24.96 | 3.57 | 23 |
| 25.55 | 3.49 | 11* |
| 25.93 | 3.44 | 73 |
| 26.82 | 3.32 | 20 |
| 27.54 | 3.24 | 9 |
| 28.32 | 3.15 | 9** |
| 29.07 | 3.07 | 5** |
| 31.50 | 2.840 | 3 |
| 32.15 | 2.784 | 3 |
| 33.31 | 2.690 | 6 |
| 34.48 | 2.601 | 2 |
| 36.26 | 2.478 | 2 |
| 37.03 | 2.428 | 2 |
| 37.75 | 2.383 | 6 |

+ = Non-crystallographic MCM-49 peak
* = Impurity peak
** = May contain impurity peak

TABLE VI

| Degrees 2-Theta | Interplanar d-spacing (A) | I/I$_o$ |
| --- | --- | --- |
| 3.9 | 22.8 | 6+ |
| 6.88 | 12.84 | 46 sh |
| 7.11 | 12.43 | 100 |
| 7.97 | 11.10 | 57 |
| 9.35 | 9.46 | 25* |
| 9.94 | 8.90 | 48 |
| 12.53 | 7.07 | 4* |
| 12.82 | 6.90 | 13 |
| 13.41 | 6.60 | 3* |
| 14.30 | 6.19 | 36 |
| 14.73 | 6.01 | 6 |
| 15.93 | 5.56 | 10 |
| 17.90 | 4.96 | 2 |
| 18.98 | 4.68 | 3 |
| 19.34 | 4.59 | 3 |
| 20.18 | 4.40 | 11 |
| 21.56 | 4.12 | 11 |
| 21.86 | 4.07 | 18 |
| 22.34 | 3.98 | 10 |
| 22.67 | 3.92 | 30 |
| 23.68 | 3.76 | 17 |
| 24.94 | 3.57 | 15 |
| 25.20 | 3.53 | 6* |
| 25.97 | 3.43 | 60 |
| 26.93 | 3.31 | 13 |
| 27.79 | 3.21 | 11 |
| 28.56 | 3.13 | 8** |
| 29.10 | 3.07 | 3** |
| 29.60 | 3.02 | 1 |
| 31.58 | 2.83 | 3 |
| 32.24 | 2.776 | 3 |
| 33.34 | 2.688 | 7 |
| 34.59 | 2.593 | 3 |
| 36.33 | 2.473 | 1 |
| 37.05 | 2.426 | 2 |
| 37.79 | 2.380 | 4 | sh = Shoulder
+ = Non-crystallographic MCM-49 peak
* = Impurity peak
** = May contain impurity peak

EXAMPLE 4

The calcined portion of the product of Example 3 was ammonium exchanged and calcined at 538° C. in air for 16 hours to provide the hydrogen form transformation product of the crystalline MCM-49, The Alpha Test proved this material to have an Alpha Value of 286.

EXAMPLE 5

A 10.5 part quantity of gallium oxide was added to a solution containing 1.0 part sodium aluminate, 3.05 parts 50% NaOH solution and 280 parts H$_2$O. A 25.6 part quantity of HMI was added followed by 56.6 parts of Ultrasil and 1.7 parts of MCM-22 seeds. The slurry was thoroughly mixed.

The composition of the reaction mixture in mole ratios:

$SiO_2/Al_2O_3 = 138$
$SiO_2/Ga_2O_3 = 17.9$
$OH/SiO_2 = 0.057$
$Na/SiO_2 = 0.057$
$HMI/SiO_2 = 0.30$
$H_2O/SiO_2 = 18.4$

Figure 4:
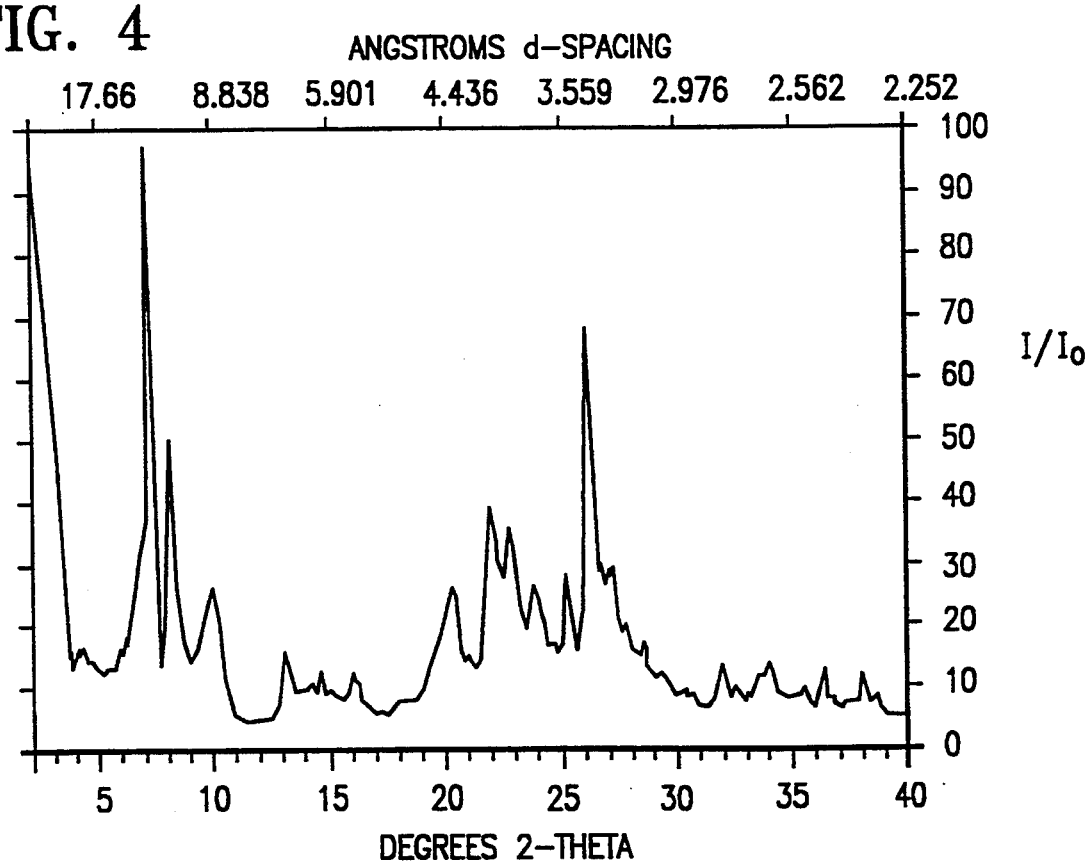

The mixture was crystallized with stirring at 150° C. for 10 days. The product was identified as poorly crystalline MCM-49 and had the X-ray pattern which appears in Table VII and FIG. 4.

The chemical composition of the product was, in wt. %:

| N | 1.89 |
| --- | --- |
| Na | 0.40 |
| Ga | 8.5 |
| Al$_2$O$_3$ | 0.81 |
| SiO$_2$ | 65.6 |
| Ash | 79.3 | with silica/alumina and silica/gallia molar ratios for the product of:

| SiO$_2$/Al$_2$O$_3$ | 138 |
| --- | --- |
| SiO$_2$/Ga$_2$O$_3$ | 17.9 |

The sorption capacities, after calcining for 3 hours at 538° C. were, in wt. %:

| Cyclohexane, 40 Torr | 13.3 |
| --- | --- |
| n-Hexane, 40 Torr | 11.3 |
| H$_2$O, 12 Torr | 12.3 |

A portion of the sample was calcined in air for 16 hours at 538° C. This material exhibited the X-ray diffraction pattern shown in Table VIII.

TABLE VII

| Degrees 2-Theta | Interplanar d-spacing (A) | I/I$_o$ |
| --- | --- | --- |
| 3.9 | 22.8 | 6+ |
| 6.66 | 13.27 | 30 sh |
| 7.08 | 12.48 | 100 |
| 7.92 | 11.17 | 43 |
| 9.27 | 9.54 | 8* |
| 9.74 | 9.08 | 20 |
| 12.78 | 6.93 | 12 |
| 13.75 | 6.44 | 6 |
| 14.28 | 6.20 | 5 |
| 14.62 | 6.06 | 3 |
| 15.78 | 5.62 | 8 |
| 17.99 | 4.93 | 3 |
| 18.92 | 4.69 | 6 |
| 20.10 | 4.42 | 24 |
| 20.86 | 4.26 | 9 |
| 21.47 | 4.14 | 10 |
| 21.73 | 4.09 | 26 |
| 22.57 | 3.94 | 29 |
| 23.53 | 3.78 | 22 |
| 24.92 | 3.57 | 24 |
| 25.91 | 3.44 | 82 |
| 26.80 | 3.33 | 19 |
| 27.43 | 3.25 | 14 |
| 28.31 | 3.15 | 10 |
| 29.04 | 3.07 | 5 |
| 31.59 | 2.832 | 8 |
| 32.17 | 2.783 | 3 |
| 33.25 | 2.694 | 6 |
| 33.70 | 2.659 | 8* |
| 35.12 | 2.555 | 4* |
| 35.96 | 2.497 | 11* |
| 36.29 | 2.476 | 4 |
| 37.73 | 2.384 | 7 | sh = Shoulder
+ = Non-crystallographic MCM-49 peak
* = Impurity peak

TABLE VIII

| Degrees 2-Theta | Interplanar d-spacing (A) | I/I$_o$ |
| --- | --- | --- |
| 3.9 | 22.8 | 11+ |
| 6.89 | 12.83 | 40 sh |
| 7.11 | 12.43 | 100 |
| 7.96 | 11.11 | 55 |
| 9.40 | 9.41 | 10* |
| 9.94 | 8.90 | 47 |
| 12.81 | 6.91 | 10 |
| 14.31 | 6.19 | 32 |
| 14.74 | 6.01 | 4 |
| 15.94 | 5.56 | 12 |
| 17.89 | 4.96 | <1 |
| 19.00 | 4.67 | 3 |
| 19.39 | 4.58 | 3 |
| 20.22 | 4.39 | 9 |
| 21.56 | 4.12 | 9 |
| 21.86 | 4.07 | 17 |
| 22.70 | 3.92 | 29 |
| 23.70 | 3.75 | 16 |
| 24.99 | 3.56 | 14 |
| 26.01 | 3.43 | 57 |
| 26.96 | 3.31 | 12 |
| 27.84 | 3.20 | 10 |
| 28.60 | 3.12 | 5 |
| 29.10 | 3.07 | 3 |
| 31.63 | 2.829 | 6 |
| 32.28 | 2.773 | 3 |
| 33.39 | 2.684 | 7 |
| 33.72 | 2.658 | 9* |
| 35.07 | 2.559 | 4* |
| 35.94 | 2.499 | 4* |
| 36.40 | 2.468 | 1 |
| 37.13 | 2.422 | 2 |
| 37.88 | 2.375 | 3 | sh = Shoulder
+ = Non-crystallographic MCM-49 peak
* = Impurity peak

EXAMPLE 6

The calcined portion of the product of Example 5 was ammonium exchanged and calcined at 538° C. in air for 16 hours to provide the hydrogen form transformation product of the crystalline MCM-49. The Alpha Test proved this material to have an Alpha Value of 64.

EXAMPLE 7

A solution containing 1 part of $Al_2(SO_4)_3 \cdot xH_2O$, 1.31 parts of 50% NaOH solution and 14.0 parts of $H_2O$ was prepared. To this were added 2.8 parts of Ultrasil precipitated silica followed by 1.48 parts of HMI. The reaction mixture was thoroughly mixed. The composition of the reaction mixture in mole ratios was:

$SiO_2/Al_2O_3 = 25.5$
$OH/SiO_2 = 0.15$
$Na/SiO_2 = 0.39$
$HMI/SiO_2 = 0.35$
$H_2O/SiO_2 = 19.4$

Figure 5:
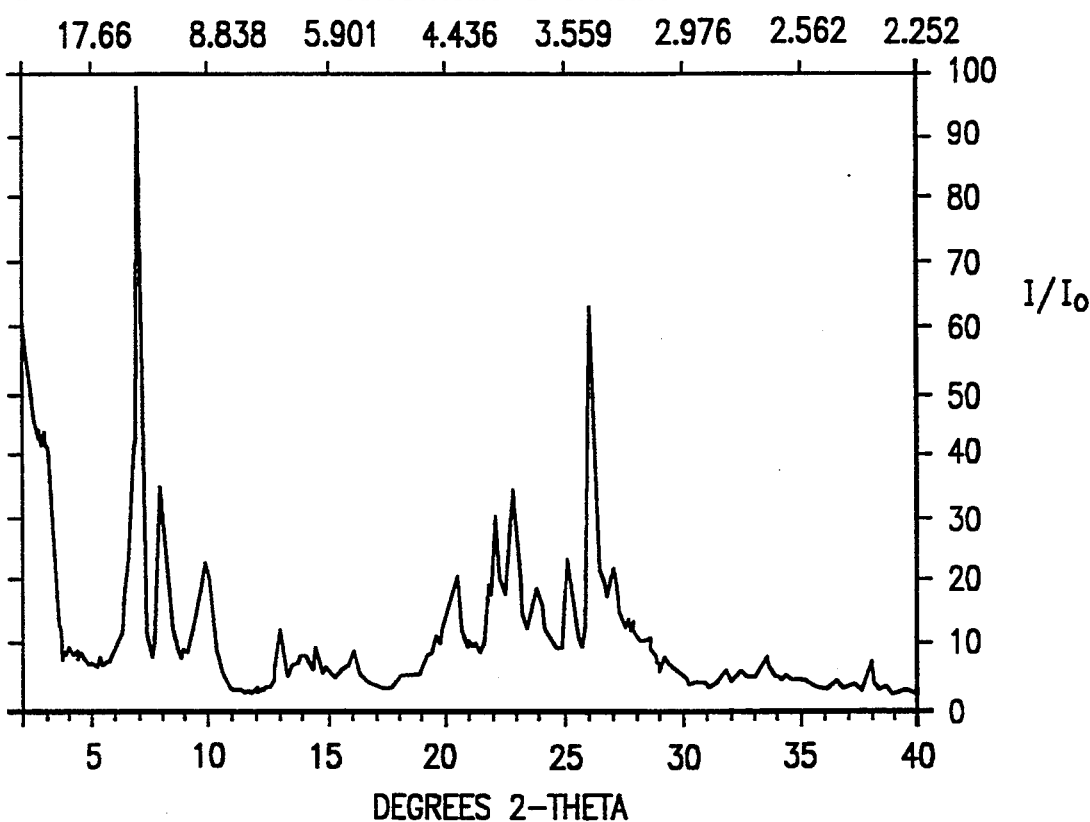

The mixture was crystallized for 5 days at 143° C. The product was washed,, dried at 120° C. and identified by X-ray analysis as MCM-49. It exhibited an X-ray pattern as shown in Table IX and FIG. 5.

The sorption capacities, after calcining for 16 hours at 538° C. were, in wt. %:

| | |
| --- | --- |
| Cyclohexane, 40 Torr | 8.8 |
| n-Hexane, 40 Torr | 15.9 |
| $H_2O$, 12 Torr | 13.6 |

The chemical composition of the product was, in wt. %:

| | |
| --- | --- |
| N | 1.83 |
| Na | 0.27 |
| $Al_2O_3$ | 6.8 |
| $SiO_2$ | 73.8 |
| Ash | 80.5 |

The silica/alumina mole ratio of the product was 18.4.
The surface area of this material was measured to be 459 m²/g.

A portion of the sample was calcined in air for 16 hours at 538° C. This material exhibited the X-ray diffraction pattern shown in Table X.

TABLE IX

| Degrees 2-Theta | Interplanar d-spacing (A) | I/I$_o$ |
| --- | --- | --- |
| 3.1 | 28.5 | 17 |
| 4.0 | 22.2 | 3+ |
| 6.73 | 13.14 | 43 sh |
| 7.08 | 12.48 | 100 |
| 7.92 | 11.16 | 42 |
| 9.69 | 9.13 | 23 |
| 12.80 | 6.91 | 13 |
| 13.76 | 6.44 | 7 |
| 14.27 | 6.20 | 6 |
| 14.65 | 6.05 | 3 |
| 15.85 | 5.59 | 7 |
| 17.82 | 4.98 | 2 |
| 18.92 | 4.69 | 3 |
| 19.32 | 4.59 | 8 |
| 20.13 | 4.41 | 20 |
| 21.48 | 4.14 | 12 |
| 21.82 | 4.07 | 31 |
| 22.56 | 3.94 | 36 |
| 23.59 | 3.77 | 18 |
| 24.91 | 3.57 | 22 |
| 25.91 | 3.44 | 79 |

TABLE IX-continued

| Degrees 2-Theta | Interplanar d-spacing (A) | I/I$_o$ |
|---|---|---|
| 26.74 | 3.33 | 20 |
| 27.61 | 3.23 | 7 |
| 28.25 | 3.16 | 8 |
| 29.14 | 3.06 | 3 |
| 31.48 | 2.842 | 3 |
| 32.16 | 2.783 | 3 |
| 33.26 | 2.694 | 6 |
| 33.85 | 2.648 | 3 sh |
| 34.72 | 2.584 | 2 |
| 36.26 | 2.478 | 2 |
| 37.00 | 2.429 | 2 |
| 37.73 | 2.384 | 7 | sh = Shoulder
+ = Non-crystallographic MCM-49 peak

EXAMPLE 8

A 2.24 part quantity of 45% sodium aluminate was added to a solution containing 1.0 part of 50% NaOH solution and 43.0 parts H$_2$O in an autoclave. An 8.57 part quantity of Ultrasil precipitated silica was added with agitation, followed by 4.51 parts of HMI.

The reaction mixture had the following composition, in mole ratios:

SiO$_2$/Al$_2$O$_3$=23
OH/SiO$_2$=0.21
Na/SiO$_2$=0.21
HMI/SiO$_2$=0.35
H$_2$O/SiO$_2$=19.3

Figure 6:
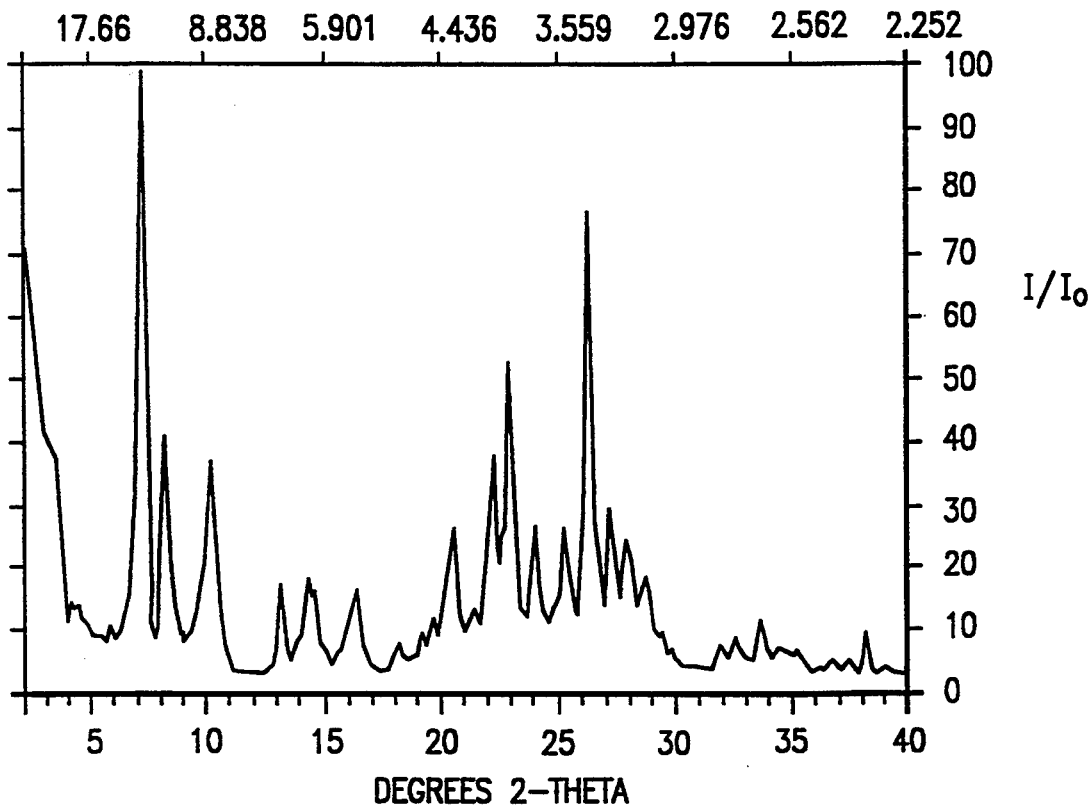

The mixture was crystallized at 150° C. for 84 hours with stirring. The product was identified as MCM-49 and had the X-ray pattern which appears in Table XI and FIG. 6.

The chemical composition of the product was, in wt. %:

| N | 1.70 |
|---|---|
| Na | 0.70 |
| Al$_2$O$_3$ | 7.3 |
| SiO$_2$ | 74.5 |
| Ash | 84.2 |

The silica/alumina mole ratio of the product was 17.3.

The sorption capacities, after calcining at 538° C. for 9 hours were, in wt. %:

| Cyclohexane, 40 Torr | 10.0 |
|---|---|
| n-Hexane, 40 Torr | 13.1 |
| H$_2$O, 12 Torr | 15.4 |

A portion of the sample was calcined in air for 3 hours at 538° C. This material exhibited the X-ray diffraction pattern shown in Table XII.

TABLE X

| Degrees 2-Theta | Interplanar d-spacing (A) | I/I$_o$ |
|---|---|---|
| 3.9 | 22.8 | 6+ |
| 6.91 | 12.79 | 38 sh |
| 7.12 | 12.42 | 100 |
| 7.96 | 11.10 | 53 |
| 9.94 | 8.90 | 39 |
| 12.84 | 6.90 | 11 |
| 14.30 | 6.19 | 39 |
| 14.71 | 6.02 | 10 |
| 15.92 | 5.57 | 12 |
| 18.00 | 4.93 | 1 |
| 18.98 | 4.67 | 3 |
| 19.34 | 4.59 | 3 |
| 20.17 | 4.40 | 10 |
| 21.55 | 4.12 | 10 |
| 21.86 | 4.07 | 17 |
| 22.67 | 3.92 | 27 |
| 23.69 | 3.75 | 15 |
| 24.96 | 3.57 | 13 |
| 25.98 | 3.43 | 61 |
| 26.93 | 3.31 | 13 |
| 27.80 | 3.21 | 9 |
| 28.58 | 3.12 | 6 |
| 29.11 | 3.07 | 2 |
| 29.63 | 3.02 | 1 |
| 31.57 | 2.834 | 3 |
| 32.23 | 2.777 | 3 |
| 33.35 | 2.687 | 6 |
| 34.60 | 2.593 | 3 |
| 36.34 | 2.472 | 1 |
| 37.06 | 2.426 | 1 |
| 37.83 | 2.378 | 5 | sh = Shoulder
+ = Non-crystallographic MCM-49 peak

TABLE XI

| Degrees 2-Theta | Interplanar d-spacing (A) | I/I$_o$ |
|---|---|---|
| 3.1 | 28.5 | 18 |
| 3.9 | 22.8 | 7+ |
| 6.81 | 12.99 | 61 sh |
| 7.04 | 12.55 | 97 |
| 7.89 | 11.21 | 41 |
| 9.80 | 9.03 | 40 |
| 12.76 | 6.94 | 17 |
| 13.42 | 6.60 | 4* |
| 13.92 | 6.36 | 17 |
| 14.22 | 6.23 | 11 |
| 14.63 | 6.05 | 2 |
| 15.81 | 5.61 | 15 |
| 17.71 | 5.01 | 4 |
| 18.86 | 4.71 | 4 |
| 19.23 | 4.62 | 6 |
| 20.09 | 4.42 | 27 |
| 20.93 | 4.24 | 8 |
| 21.44 | 4.14 | 17 |
| 21.74 | 4.09 | 37 |
| 22.16 | 4.01 | 17 |
| 22.56 | 3.94 | 58 |
| 23.53 | 3.78 | 26 |
| 24.83 | 3.59 | 22 |
| 25.08 | 3.55 | 10 |
| 25.86 | 3.45 | 100 |
| 26.80 | 3.33 | 28 |
| 27.53 | 3.24 | 21 |
| 28.33 | 3.15 | 15 |
| 28.98 | 3.08 | 4 |
| 29.47 | 3.03 | 2 |
| 31.46 | 2.843 | 4 |
| 32.08 | 2.790 | 6 |
| 33.19 | 2.699 | 9 |
| 34.05 | 2.633 | 5 |
| 34.77 | 2.580 | 4 |
| 36.21 | 2.481 | 2 |
| 36.90 | 2.436 | 3 |
| 37.68 | 2.387 | 8 | sh = Shoulder
+ = Non-crystallographic MCM-49 peak
* = Impurity peak

TABLE XII

| Degrees 2-Theta | Interplanar d-spacing (A) | I/I$_o$ |
|---|---|---|
| 3.2 | 28.0 | 9+ |
| 3.9 | 22.8 | 7+ |
| 6.90 | 12.81 | 48 sh |

TABLE XII-continued

| Degrees 2-Theta | Interplanar d-spacing (A) | I/I$_o$ |
|---|---|---|
| 7.13 | 12.39 | 100 |
| 7.98 | 11.08 | 46 |
| 9.95 | 8.89 | 53 |
| 12.87 | 6.88 | 10 |
| 14.32 | 6.18 | 36 |
| 14.74 | 6.01 | 11 |
| 15.94 | 5.56 | 17 |
| 17.87 | 4.96 | 2 |
| 19.00 | 4.67 | 5 |
| 19.35 | 4.59 | 3 |
| 20.24 | 4.39 | 14 |
| 21.06 | 4.22 | 5 |
| 21.56 | 4.12 | 15 |
| 21.87 | 4.06 | 25 |
| 22.32 | 3.98 | 12 |
| 22.69 | 3.92 | 41 |
| 23.69 | 3.76 | 23 |
| 24.95 | 3.57 | 19 |
| 25.22 | 3.53 | 4 |
| 25.99 | 3.43 | 90 |
| 26.94 | 3.31 | 20 |
| 27.73 | 3.22 | 17 |
| 28.55 | 3.13 | 11 |
| 29.11 | 3.07 | 3 |
| 29.63 | 3.01 | 2 |
| 31.59 | 2.833 | 6 |
| 32.23 | 2.777 | 4 |
| 33.34 | 2.687 | 9 |
| 34.35 | 2.611 | 4 |
| 34.92 | 2.570 | 3 |
| 36.35 | 2.471 | 2 |
| 37.07 | 2.425 | 2 |
| 37.82 | 2.379 | 6 | sh = Shoulder
+ = Non-crystallographic MCM-49 peak

EXAMPLE 9

The calcined portion of the product of Example 8 was ammonium exchanged and calcined at 538° C. in air for 3 hours to provide the hydrogen form transformation product of the crystalline MCM-49. The Alpha Test proved this material to have an Alpha Value of 308.

EXAMPLE 10

Sodium aluminate comprising 40 wt. % Al$_2$O$_3$, 33 wt. % Na$_2$O, and 27 wt. % H$_2$O was added to a solution containing NaOH and H$_2$O in an autoclave. Ultrasil precipitated silica was then added with agitation, followed by aminocycloheptane (R) directing agent to form a reaction mixture.

This mixture had the following composition, in mole ratios:

SiO$_2$/Al$_2$O$_3$=33.3
OH/SiO$_2$=0.18
Na/SiO$_2$=0.18
R/SiO$_2$=0.35
H$_2$O/SiO$_2$=18.8

Figure 7:
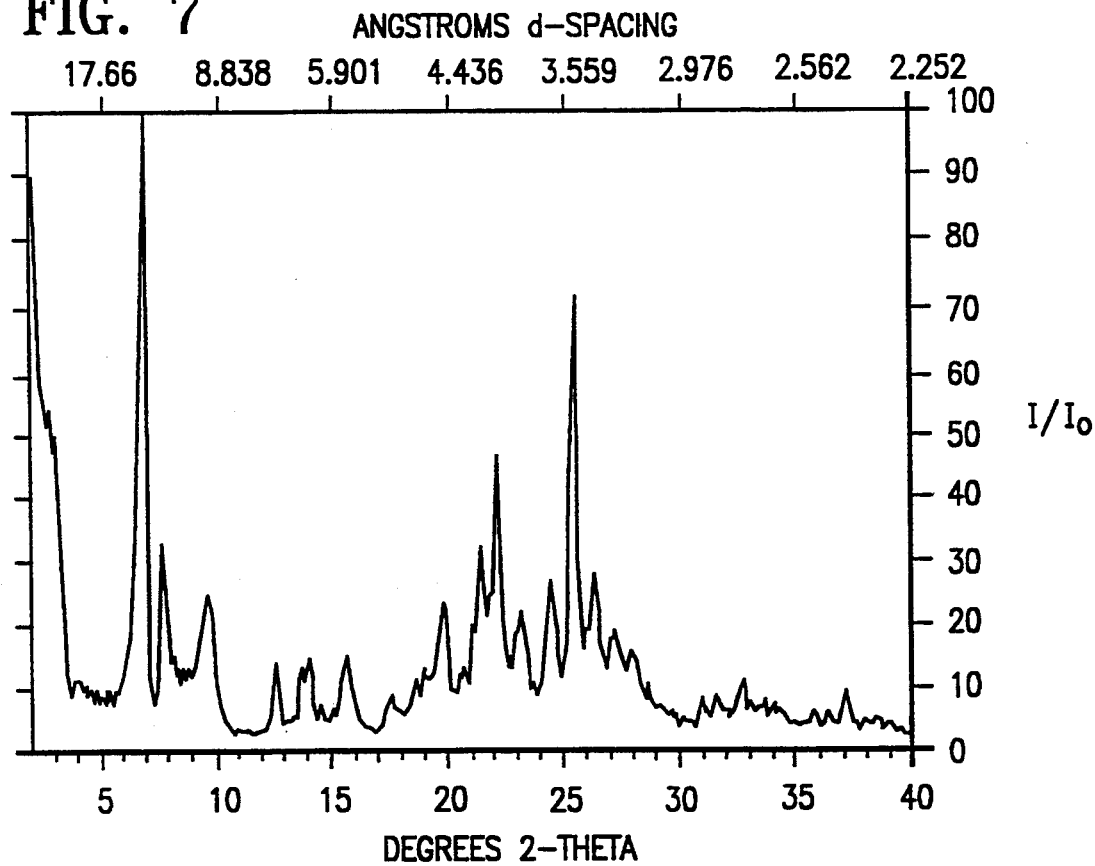

The mixture was crystallized at 143° C. for 192 hours with stirring. The product was identified as MCM-49 and had the X-ray pattern which appears in Table XIII and FIG. 7.

The chemical composition of the product was, in wt. %:

| | |
|---|---|
| N | 1.51 |
| Na | 0.83 |
| Al$_2$O$_3$ | 4.6 |
| SiO$_2$ | 74.2 |
| Ash | 79.2 |

The silica/alumina mole ratio of the product was 27.4.

The sorption capacities, after calcining at 538° C. for 9 hours were, in wt. %:

| | |
|---|---|
| Cyclohexane, 40 Torr | 7.5 |
| n-Hexane, 40 Torr | 14.0 |
| H$_2$O, 12 Torr | 13.5 |

TABLE XIII

| Degrees 2-Theta | Interplanar d-spacing (A) | I/I$_o$ |
|---|---|---|
| 4.1 | 21.4 | 1 |
| 6.87 | 12.87 | 41 |
| 7.14 | 12.38 | 100 |
| 7.98 | 11.09 | 26 |
| 9.88 | 8.95 | 18 |
| 12.85 | 6.89 | 14 |
| 14.00 | 6.33 | 10 |
| 14.31 | 6.19 | 11 |
| 14.74 | 6.01 | 2 |
| 15.88 | 5.58 | 13 |
| 17.79 | 4.99 | 4 |
| 18.95 | 4.68 | 6 |
| 19.34 | 4.59 | 7 |
| 20.20 | 4.40 | 18 |
| 21.06 | 4.22 | 7 |
| 21.51 | 4.13 | 12 |
| 21.82 | 4.07 | 27 |
| 22.63 | 3.93 | 46 |
| 23.60 | 3.77 | 19 |
| 24.90 | 3.58 | 25 |
| 25.14 | 3.54 | 7 |
| 25.92 | 3.44 | 90 |
| 26.82 | 3.32 | 26 |
| 27.66 | 3.22 | 13 |
| 28.43 | 3.14 | 12 |
| 29.03 | 3.08 | 4 |
| 29.45 | 3.03 | 3 |
| 31.51 | 2.839 | 4 |
| 32.15 | 2.784 | 5 |
| 33.24 | 2.695 | 8 |
| 34.13 | 2.627 | 4 |
| 34.84 | 2.575 | 2 |
| 36.26 | 2.477 | 3 |
| 36.97 | 2.431 | 3 |
| 37.73 | 2.384 | 7 |

EXAMPLE 11

For comparison purposes, Example 1 of U.S. Pat. No. 4,954,325, incorporated herein by reference, was repeated. The as-synthesized crystalline material of the Example, referred to herein as MCM-22 precursor or the precursor form of MCM-22, was examined by X-ray diffraction analysis. Its X-ray diffraction pattern is presented in Table XIV. The X-ray diffraction pattern of the calcined form of this material (538° C. for 20 hours) is shown in Table XV below, and in FIG. 1 of U.S. Pat. No. 4,954,325.

TABLE XIV

| Degrees 2-Theta | Interplanar d-spacing (A) | I/I$_o$ |
|---|---|---|
| 3.1 | 28.5 | 14 |
| 3.9 | 22.7 | <1 |
| 6.53 | 13.53 | 36 |
| 7.14 | 12.38 | 100 |
| 7.94 | 11.13 | 34 |
| 9.67 | 9.15 | 20 |

TABLE XIV-continued

| Degrees 2-Theta | Interplanar d-spacing (A) | I/I$_o$ |
|---|---|---|
| 12.85 | 6.89 | 6 |
| 13.26 | 6.68 | 4 |
| 14.36 | 6.17 | 2 |
| 14.70 | 6.03 | 5 |
| 15.85 | 5.59 | 4 |
| 19.00 | 4.67 | 2 |
| 19.85 | 4.47 | 22 |
| 21.56 | 4.12 | 10 |
| 21.94 | 4.05 | 19 |
| 22.53 | 3.95 | 21 |
| 23.59 | 3.77 | 13 |
| 24.98 | 3.56 | 20 |
| 25.98 | 3.43 | 55 |
| 26.56 | 3.36 | 23 |
| 29.15 | 3.06 | 4 |
| 31.58 | 2.833 | 3 |
| 32.34 | 2.768 | 2 |
| 33.48 | 2.676 | 5 |
| 34.87 | 2.573 | 1 |
| 36.34 | 2.472 | 2 |
| 37.18 | 2.418 | 1 |
| 37.82 | 2.379 | 5 |

TABLE XV

| Degrees 2-Theta | Interplanar d-spacing (A) | I/I$_o$ |
|---|---|---|
| 2.80 | 31.55 | 25 |
| 4.02 | 21.98 | 10 |
| 7.10 | 12.45 | 96 |
| 7.95 | 11.12 | 47 |
| 10.00 | 8.85 | 51 |
| 12.90 | 6.86 | 11 |
| 14.34 | 6.18 | 42 |
| 14.72 | 6.02 | 15 |
| 15.90 | 5.57 | 20 |
| 17.81 | 4.98 | 5 |
| 19.08 | 4.65 | 2 |
| 20.20 | 4.40 | 20 |
| 20.91 | 4.25 | 5 |
| 21.59 | 4.12 | 20 |
| 21.92 | 4.06 | 13 |
| 22.67 | 3.92 | 30 |
| 23.70 | 3.75 | 13 |
| 25.01 | 3.56 | 20 |
| 26.00 | 3.43 | 100 |
| 26.96 | 3.31 | 14 |
| 27.75 | 3.21 | 15 |
| 28.52 | 3.13 | 10 |
| 29.01 | 3.08 | 5 |
| 29.71 | 3.01 | 5 |
| 31.61 | 2.830 | 5 |
| 32.21 | 2.779 | 5 |
| 33.35 | 2.687 | 5 |
| 34.61 | 2.592 | 5 |

EXAMPLE 12

This example shows the alkylation of benzene with alpha $C_{14}$ olefin (Shell's Neodene-14) over zeolites MCM-49, MCM-22, and zeolite Beta. The MCM-49 was the product of Example 8; MCM-22 was the product of Example 11. The zeolite Beta was synthesized according to the teaching of U.S. Pat. No. 3,308,069, incorporated herein by reference. Portions of the zeolite materials MCM-22 and MCM-49 were bound with alumina to form catalyst of 65 wt. % zeolite and 35 wt. % binder. To prepare the bound catalysts, the zeolites were extruded (1/16 inch) with α-alumina monohydrate in the ratio of 65% zeolite and 35% Al$_2$O$_3$, dried at 120° C., calcined in flowing nitrogen (4 vol/vol/min) at 2.8° C./min to 482° C. and held at this temperature for 3 hours, NH$_4$+ion exchanged 3 times with 1N NH$_4$NO$_3$ (5 ml/g), and recalcined in flowing nitrogen (4 vol/vol/min) at 2.8° C./min to 482° C., followed by a 3 hour calcination at 538° C. in air (5 vol/vol/min).

The five alkylation reactions were carried out in a 600 ml autoclave using 37.7 g (0.19 moles) olefin, 15 g (0.19 moles) benzene, and 2.65 g of unbound catalyst or 4.1 g of bound catalyst containing 2.65 g of zeolite in each instance. Reaction time was 6 hours at 204° C. under 400 psig nitrogen. Results of these reactions were as follows:

|  | Beta | MCM-22 | | MCM-49 | |
|---|---|---|---|---|---|
|  | Unbound | Unbound | Bound | Unbound | Bound |
| Conversion, wt. % | | | | | |
| Benzene | 37 | 84 | 93 | 86 | 89 |
| $C_{14}$ olefin | 65 | 94 | 94 | 93 | 94 |
| Product comp., wt. % | | | | | |
| Monoalkylate | 58 | 64 | 76 | 68 | 82 |
| Dialkylate | 10 | 26 | 18 | 23 | 15 |
| Trialkylate | — | 5 | 3 | 4 | 2 |
| $C_{28}$ paraffins | 32 | 4 | 3 | 4 | 1 |

The results indicate a 4% improvement in monoalkylate product component for the unbound MCM-49 catalyst over unbound MCM-22. Also, a 25% reduction in by-products such as dialkylate, trialkylate, and paraffins is achieved with the application of alumina-bound MCM-49, compared with alumina-bound MCM-22.

EXAMPLE 13

Five different zeolite catalysts, Alpha values of which are set forth in Table XVI below, were used in 5 separate alkylation runs, A to E, carried out under essentially identical conditions to provide lube base stocks. The MCM-49 was the product of Example 8. Each catalyst composition comprised 65 wt. % zeolite bound with 35 wt. % alumina. To prepare the bound catalysts, the zeolites were extruded (1/16 inch) with α-alumina monohydrate in the ratio of 65% zeolite and 35% Al$_2$O$_3$, dried at 120° C., calcined in flowing nitrogen (4 vol/vol/min) at 2.8° C./min to 482° C. and held at this temperature for 3 hours, NH$_4$+ion exchanged 3 times with 1N NH$_4$NO$_3$ (5 ml/g), and recalcined in flowing nitrogen (4 vol/vol/min) at 2.8° C./min. to 482° C., followed by a 3 hour calcination at 538° C. in air (5 vol/vol/min).

TABLE XVI

| Zeolite Catalyst | MCM-49 | MCM-22 | Beta | USY | ZSM-12 |
|---|---|---|---|---|---|
| Alpha Value | 246 | 220 | 273 | 210 | 45 |

The alkylation reaction for each run was carried out in a 1 liter autoclave using 400 g (2.02 moles) of alpha $C_{14}$ olefin (Shell Neodene-14) and 79 g (1.01 moles) of benzene with 38 g catalyst at 204° C. for 6 hours under nitrogen pressure of 400 psig.

Gas Chromatographic and Field Ionization Mass Spec (FIMS) analysis indicated that the synthetic lube produced from the MCM-49 catalyst contained a mixture of mono- and di-alkyl benzene compounds, 82 and 15 wt. %, respectively, while that from the MCM-22 catalyst contained 76 and 18 wt. % respectively. The other catalysts, i.e., zeolites Beta, USY and ZSM-12, promoted not only alkylation to form mono- and di-alkyl benzenes but also $C_{14}$ oligomerization to form $C_{28}$ olefins. The alkylation process of this example over MCM-49 catalyst was high yield and selective.

EXAMPLE 14

Figure 9:
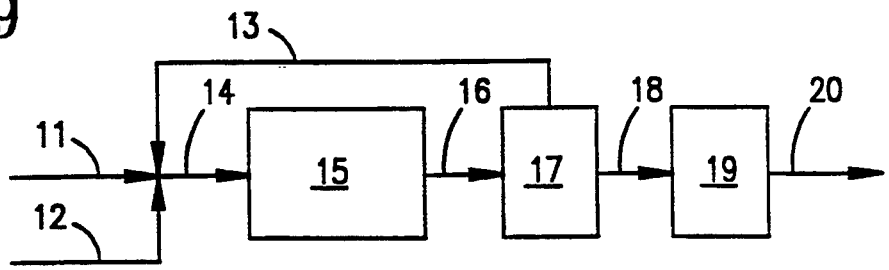
FIGS. 9–12 represent block-flow diagrams of various embodiments of the present invention.

FIG. 9 is a schematic illustration of one embodiment of the alkylation process of the present invention. In accordance with this embodiment, olefin(s) in conduit 11, aromatic(s) in conduit 12 and any unconverted olefin(s) and/or aromatic(s) in recycle conduit 13 are introduced through conduit 14 into alkylation reaction zone 15 with the effluent therefrom being introduced through conduit 16 into a product recovery zone 17 (accomplished by conventional vacuum stripping or distillation techniques). The alkylated aromatic product(s) in conduit 18 can be subjected to one or more down-stream operations, e.g., hydrotreating/hydrofinishing, etc., represented generally at 19, to provide a finished lube base stock at 20.

Depending on the final and desired lube viscosity, the feed reactants can include long chain alpha olefins, e.g., $C_8$-$C_{30}$ olefins, with the double bond located at the terminal (alpha) position or at some internal position, and the aromatic reactant can include single ring or double rings with or without substitution.

EXAMPLE 15

Figure 10:
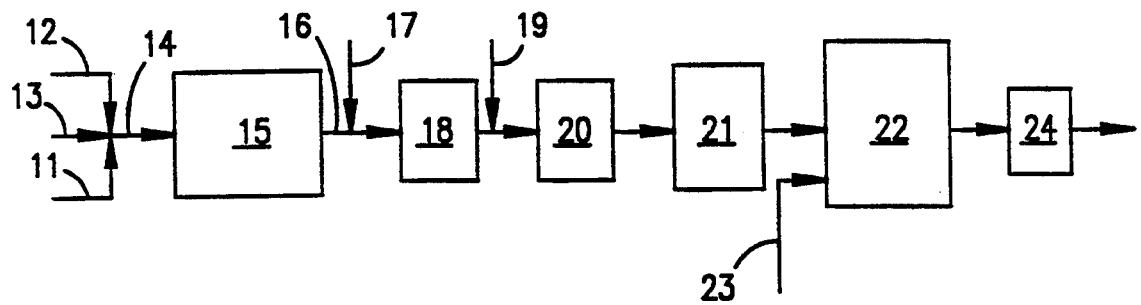

FIG. 10 is a schematic illustration of an alkylation process in accordance with this invention which utilizes an olefinic feedstock obtained from the oligomerization of 1-decene employing propanol-promoted $BF_3$ catalyst.

1-Decene in conduit 11, $BF_3$ in conduit 12 and propanol in conduit 13 are introduced through conduit 14 into oligomerization reactor 15 maintained under oligomerization reaction conditions. The oligomerized product in conduit 16 is combined with sodium hydroxide from conduit 17 in a first wash operation in 18, and thereafter with water from conduit 19 in a second wash operation 20 prior to separation of light products therefrom in vacuum distillation unit 21. Alkylation in accordance with the present invention is carried out with 250 g of the 1-decene oligomers (250 g; 76 wt. %), containing 33 wt. % $C_{30}$ olefin, 52 wt. % $C_{40}$ olefin and 15 wt. % $C_{50}$ olefin, in alkylation reactor 22 with benzene (78 g; 24 wt. %) introduced therein through conduit 23. Reactor 22 contains 22 g zeolite MCM-49 prepared as in Example 8, and the reaction is carried out at 400 psig nitrogen and 204° C. for 6 hours.

After decanting the catalyst and distilling any unreacted benzene, the lube yield is about 88 wt. % indicating that about 12 wt. % benzene is alkylated and incorporated into the backbone structure of the decene oligomers. This is further confirmed by IR analysis.

This example indicates that the zeolite MCM-49 alkylation step produces a benzene-containing synthetic lube base stock with excellent product properties such as very low pour, cloud point and high Viscosity Index together with improved additive solvency characteristics as well as enhanced thermal and oxidative stability.

As shown in FIG. 10, the lube base stock can be subjected to one or more down-stream finishing operations shown generally at 24.

EXAMPLE 16

Figure 11:
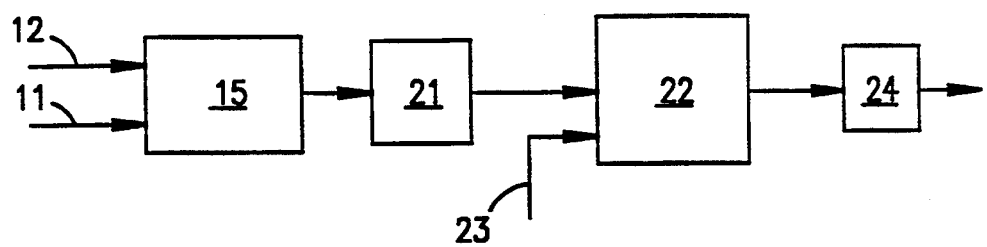

FIG. 11 is a schematic illustration of the alkylation process of this invention carried out with a 1-decene oligomer product obtained with $Cr/SiO_2$ catalyst.

Thus, 1-decene in conduit 11 and $Cr/SiO_2$ in conduit 12 are introduced into oligomerization reactor 15 with the product therefrom being vacuum stripped in 21 and thereafter being introduced into alkylation reactor 22 together with benzene from conduit 23. As in the process shown in FIG. 10, the lube stock can be further treated, for example, by hydrofinishing, shown generally at 24.

The alkylation reaction is carried out under identical process conditions as in Example 15 but using 500 g decene oligomers and 95 g of benzene with 36 g of zeolite MCM-49 catalyst.

EXAMPLE 17

Figure 12:
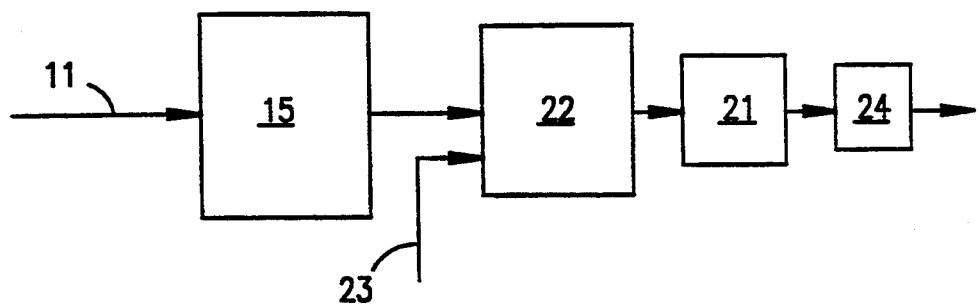

FIG. 12 illustrates the combination of a ZSM-5-catalyzed conversion of light olefin (introduced through conduit 11 into olefin conversion reactor 15) to provide gasoline and distillate with the MCM-49 catalyzed alkylation of the latter in alkylation reactor 22 providing an aromatic-containing lube base stock from which light components are removed, e.g., by vacuum distillation in unit 21, followed by optional downstream finishing in unit 24. In a manner similar to Example 15, 400 g of 400°–700° F. (204°–371° C.) distillate (78 wt. %) is alkylated with 115 g naphthalene (12 wt. %) from conduit 23 over MCM-49 catalyst. The resulting 700° F.+ (371° C.+) lube yield is about 54 wt. %.

EXAMPLE 18

A number of experiments were conducted for benzene alkylation with tetradecene alkylating agent over catalysts comprising MCM-49. In each experiment, 2.65 g of unbound zeolite or 4.1 g of bound catalyst containing about 2.65 g zeolite was used. The molar ratio of tetradecene/benzene was 1/1 in each experiment. For the bound catalysts, binders were alumina, silica, or zirconia. The MCM-49 was made as in Example 8, and the bound catalysts were prepared as in Example 12. Results, measured at various reaction temperatures, are presented in Table XVII.

TABLE XVII

| MCM-49 Catalyst | Conversion, Wt. % | | Product Composition, Wt. % | | | |
|---|---|---|---|---|---|---|
| | Benzene | $C_{14}=$ | Monoalkylate | Dialkylate | Trialkylate | $C_{28}$ Paraffins |
| Unbound | | | | | | |
| at 177° C. | 79 | 96 | 72 | 20 | 4 | 3 |
| at 204° C. | 79 | 92 | 66 | 26 | 5 | 3 |
| at 204° C. | 86 | 93 | 68 | 23 | 4 | 4 |
| Alumina-bound | | | | | | |
| at 177° C. | 89 | 96 | 85 | 12 | 0 | 3 |
| at 204° C. | 89 | 94 | 82 | 15 | 2 | 1 |
| Zirconia-bound | | | | | | |
| at 177° C. | 86 | 93 | 87 | 9 | 0 | 4 |
| at 204° C. | 79 | 92 | 75 | 15 | 0 | 3 |
| at 232° C. | 72 | 87 | 63 | 16 | 0 | 5 |

TABLE XVII-continued

| MCM-49 Catalyst | Conversion, Wt. % | | Product Composition, Wt. % | | | |
|---|---|---|---|---|---|---|
| | Benzene | C$_{14}$= | Monoalkylate | Dialkylate | Trialkylate | C$_{28}$ Paraffins |
| Silica-bound | | | | | | |
| at 177° C. | 86 | 96 | 77 | 17 | 3 | 2 |
| at 204° C. | 79 | 92 | 70 | 20 | 3 | 2 |

What is claimed is:

1. A process for preparing long chain alkyl aromatic compounds which comprises contacting at least one alkylatable aromatic compound with at least one alkylating agent possessing an alkylating aliphatic group having at least six carbon atoms under alkylation reaction conditions and in the presence of an alkylation catalyst to provide an alkylated aromatic product possessing at least one alkyl group derived from said alkylating agent, said catalyst comprising synthetic porous crystalline MCM-49.

2. The process of claim 1 wherein the synthetic porous crystalline MCM-49 has a composition comprising the molar relationship $$X_2O_3:(n)YO_2,$$

wherein n is less than about 35, X is a trivalent element and Y is a tetravalent element.

3. The process of claim 2 wherein n is from about 2 to less than about 35.

4. The process of claim 3 wherein n is from about 10 to less than about 35.

5. The process of claim 2 wherein X is a trivalent element selected from the group consisting of aluminum, boron, iron, gallium, and mixtures thereof, and Y is a tetravalent element selected from the group consisting of silicon, titanium, germanium, and mixtures thereof.

6. The process of claim 5 wherein X comprises aluminum and Y comprises silicon.

7. The process of claim 1 wherein said synthetic porous crystalline MCM-49 has been treated to replace original cations, at least in part, with a cation or mixture of cations selected from the group consisting of hydrogen, hydrogen precursors, rare earth metals, and metals of Groups IIA, IIIA, IVA, IB, IIB, IIIB, IVB, VIB and VIII of the Periodic Table.

8. The process of claim 1 wherein said synthetic porous crystalline MCM-49 has been thermally treated at a temperature up to about 925° C. in the presence or absence of steam.

9. The process of claim 7 wherein said synthetic porous crystalline MCM-49 has been thermally treated at a temperature up to about 925° C. in the presence or absence of steam.

10. The process of claim 1 wherein said catalyst comprises a material matrix.

11. The process of claim 10 wherein said matrix material comprises alumina, silica, zirconia, titania, or mixture thereof.

12. The process of claim 10 wherein the catalyst is provided in the form of extrudate, beads or fluidizable microspheres.

13. The process of claim 1 wherein the alkylating aliphatic group contains at least about 8 carbon atoms.

14. The process of claim 1 wherein the alkylating aliphatic group contains at least about 12 carbon atoms.

15. The process of claim 1 wherein the alkylating agent is an olefin.

16. The process of claim 1 wherein the alkylating agent is an alcohol.

17. The process of claim 1 wherein the alkylating agent is an alkyl halide.

18. The process of claim 1 wherein the alkylatable aromatic compound is selected from the group consisting of benzene, xylene, toluene and 1,2,3,5-tetramethylbenzene.

19. The process of claim 1 wherein the alkylatable aromatic compound is selected from the group consisting of naphthalene, anthracene, naphthacene, perylene, coronene and phenanthrene.

20. The process of claim 1 wherein the alkylation reaction conditions include a temperature of from about 0° C. to about 500° C., a pressure of from about 0.2 to about 25 atmospheres, a WHSV of from about 0.1 to 500 hr$^{-1}$ and an alkylatable aromatic compound to alkylating agent mole ratio of from about 0.1:1 to 50:1.

21. The process of claim 1 wherein the alkylation reaction conditions include a temperature of from about 100° C. to 350° C., a pressure of from about 1 to about 25 atmospheres, a WHSV of from about 0.5 to about 100 hr$^{-1}$ and an alkylatable aromatic compound to alkylating agent mole ratio of from about 0.5:1 to about 5:1.

22. A process for alkylating an alkylatable polynuclear aromatic hydrocarbon which comprises contacting the alkylatable polynuclear aromatic hydrocarbon with an olefinic alkylating agent having at least about 6 carbon atoms under alkylation reaction conditions and in the presence of an alkylation catalyst comprising synthetic porous crystalline MCM-49.

23. The process of claim 22 wherein the polynuclear aromatic hydrocarbon is selected from the group consisting of naphthalene, anthracene, perylene, coronene and phenanthrene.

24. The process of claim 22 wherein the olefinic alkylating agent contains at least about 12 carbon atoms.

* * * * *